United States Patent
Riha et al.

(10) Patent No.: US 11,584,065 B2
(45) Date of Patent: Feb. 21, 2023

(54) ADDITIVELY MANUFACTURED STRUCTURE AND METHOD FOR MAKING THE SAME

(71) Applicant: RAPIDFLIGHT HOLDINGS, LLC, Manassas, VA (US)

(72) Inventors: David Riha, Knoxville, TN (US); Alexis Fiechter, Mesa, AZ (US); Robert Bedsole, Knoxville, TN (US); Charles Hill, Topton, NC (US); Timofei Novikov, Friendsville, TN (US); Kyle Rowe, Knoxville, TN (US)

(73) Assignee: RapidFlight Holdings, LLC, Manassas, VA (US)

( * ) Notice: Subject to any disclaimer, the term of this patent is extended or adjusted under 35 U.S.C. 154(b) by 698 days.

(21) Appl. No.: 16/255,605

(22) Filed: Jan. 23, 2019

(65) Prior Publication Data
US 2019/0224909 A1   Jul. 25, 2019

Related U.S. Application Data

(60) Provisional application No. 62/620,891, filed on Jan. 23, 2018.

(51) Int. Cl.
*B29C 64/118* (2017.01)
*B33Y 10/00* (2015.01)
(Continued)

(52) U.S. Cl.
CPC .......... *B29C 64/118* (2017.08); *B29C 64/245* (2017.08); *B29C 64/40* (2017.08);
(Continued)

(58) Field of Classification Search
CPC ..... B29C 64/245; B29C 64/118; B33Y 10/00; B33Y 30/00
See application file for complete search history.

(56) References Cited

U.S. PATENT DOCUMENTS 9,718,498 B1   8/2017   Faruque et al.
2014/0141168 A1   5/2014   Rodgers
(Continued)

FOREIGN PATENT DOCUMENTS

CN   106626369 A   5/2017
WO   WO 2012/174332 A1   12/2012
(Continued)

OTHER PUBLICATIONS

WO, International Search Report & Written Opinion, Application No. PCT/US2019/014792, dated May 2, 2019.
(Continued)

*Primary Examiner* — Larry W Thrower
(74) *Attorney, Agent, or Firm* — Polsinelli PC

(57) ABSTRACT

An additively manufactured structure and methods for making and using same. In a method for making the structure, a first layer structure can be formed. A second layer structure can be formed on the first layer structure and a support structure. The support structure can be removed from the second layer structure. The second layer structure can include an overhang structure that does not deform or break after the support structure is removed. The support structure can provide support to the second layer structure during printing. Strong bridging capability of the second layer structure is not required. The support structure can be quick and easy to make. The support structure can be reusable and does not add weight to the printed structure. The support structure can be easily removed after completing of printing. Installation of the support structure can be fast without significantly interfering with printing process.

17 Claims, 24 Drawing Sheets

(51) Int. Cl.
*B33Y 30/00* (2015.01)
*B29C 64/40* (2017.01)
*B29C 64/245* (2017.01)
*B29L 31/30* (2006.01)
*B33Y 80/00* (2015.01)
*B33Y 50/02* (2015.01)

(52) U.S. Cl.
CPC .............. *B33Y 10/00* (2014.12); *B33Y 30/00* (2014.12); *B29L 2031/3005* (2013.01); *B29L 2031/3044* (2013.01); *B33Y 50/02* (2014.12); *B33Y 80/00* (2014.12)

(56) References Cited

U.S. PATENT DOCUMENTS

| | | |
|---|---|---|
| 2014/0333011 A1 | 11/2014 | Javidan et al. |
| 2014/0353878 A1 | 12/2014 | Driessen et al. |
| 2016/0207263 A1* | 7/2016 | Gordon .................. B33Y 30/00 |
| 2016/0236421 A1 | 8/2016 | Mannella et al. |
| 2016/0250808 A1 | 9/2016 | Barnwell, III et al. |
| 2017/0137327 A1* | 5/2017 | Capobianco ........ C04B 35/6264 |
| 2017/0253354 A1 | 9/2017 | Colson et al. |
| 2017/0212986 A1 | 11/2017 | Qian |
| 2017/0312986 A1 | 11/2017 | Qian |
| 2018/0154437 A1* | 6/2018 | Mark .................... B22F 1/0085 |
| 2019/0030605 A1* | 1/2019 | TenHouten ............ B62D 29/04 |

FOREIGN PATENT DOCUMENTS

| | | |
|---|---|---|
| WO | WO 2014/081594 A1 | 5/2014 |
| WO | WO 2016/136166 A1 | 9/2016 |
| WO | WO 2017/025956 A1 | 2/2017 |
| WO | WO 2017/180958 A2 | 10/2017 |
| WO | WO 2018/044399 A1 | 3/2018 |

OTHER PUBLICATIONS

CA, Office Action, Application No. 3,089,364, dated Aug. 26, 2021.
KR, Office Action, Application No. 10-2020-7024115, dated Jun. 18, 2021.
CN, First Office Action, Application No. 201980019811.7, dated Nov. 17, 2021.
EP, Extended European Search Report, Application No. 21 203 820.2, dated Feb. 3, 2022.

* cited by examiner

ADDITIVELY MANUFACTURED STRUCTURE AND METHOD FOR MAKING THE SAME

CROSS-REFERENCE TO RELATED APPLICATIONS

This application claims priority to U.S. provisional patent application, Ser. No. 62/620,891, filed on Jan. 23, 2018. Priority to the provisional patent application is expressly claimed, and the disclosure of the provisional application is hereby incorporated herein by reference in its entirety and for all purposes.

CROSS-REFERENCE TO RELATED NONPROVISIONAL APPLICATIONS

The following Patent Cooperation Treaty (PCT) patent application is fully owned by the assignee of the present application and is filed on the same date herewith. The disclosure of the PCT patent application is hereby incorporated herein by reference in its entirety and for all purposes: "ADDITIVELY MANUFACTURED STRUCTURE AND METHOD FOR MAKING THE SAME," Attorney Matter No. 36681.4002PCT, filed on Jan. 23, 2019.

FIELD

The disclosed embodiments relate generally to additive manufacturing and more particularly, but not exclusively, to additively manufactured structures and methods for making the same.

BACKGROUND

Three-dimensional (3D) printing, also known as additive manufacturing, is a technique that deposits materials only where needed, thus resulting in significantly less material wastage than traditional manufacturing techniques, which typically form parts by reducing or removing material from a bulk material. In typical additive manufacturing processes, a 3D object is created by forming layers of material under computer control. While the first three-dimensional (3D) printed articles were generally models, the industry is quickly advancing by creating 3D printed articles that may be functional parts in more complex systems, such as hinges, tools, structural elements.

Additive manufacturing for making a 3D article on a large scale (i.e., typically with at least one dimension greater than 5 feet) can be referred to as large-scale additive manufacturing. A system (or technique) for large scale additive manufacturing can be referred to as large scale additive manufacturing system (or technique). Exemplary large scale additive manufacturing systems include, for example, the Big Area Additive Manufacturing (BAAM) 100 ALPHA available from Cincinnati Incorporated located in Harrison, Ohio, or the Large Scale Additive Manufacturing (LSAM) machine available from Thermwood Corporation located in Dale, Ind. Exemplary systems that use extrusion deposition for large scale additive manufacturing includes the BAAM 100 ALPHA and the LSAM machine.

Large-scale additive manufacturing has recently become an area of greater research, use, and technology advancement because of improvements in material properties and increased needs of customized large structures. For example, Local Motors located in Phoenix, Ariz. was the first to use large-scale additive manufacturing, or large-scale extrusion deposition, to print a vehicle. However, large-scale additive manufacturing also faces great challenges that cannot be resolved by directly adopting technology used in smaller-scale additive manufacturing. One of the challenges is making overhang or bridge structures that are not subject to failures such as deformation (such as drooping) or breaking under gravity. An overhang structure can include a portion of a printed structure that extends from a main part of the printed structure and into empty space in a direction at least partially orthogonal to gravity. A bridge structure can include an exemplary overhang structure having two opposing end regions each connected to a printed structure.

Inventors of the present disclosure have discovered that, although smaller-scale additive manufacturing may encounter the difficulty of making overhang structures, the difficulty is especially severe and presents unique challenges in large-scale additive manufacturing. For example, in a large-scale extrusion deposition process, an extruded bead at large scale can hold heat much longer and remain in a rubbery or molten state long after the nozzle has attempted to deposit the bead in a desired location. During solidification of the bead, the bead may not be able to maintain dimension under the weight of the bead itself and/or under the weight of material printed on top of the bead. Further, the inventors have considered using a rapid solidification process to speed up the solidification, such as spraying the bead with liquid nitrogen, but considered that the rapid solidification process may reduce inter-laminar adhesion between printed layers and weaken strength of the large-scale printed structure. In contrast, in a small-scale extrusion deposition process, fans can be used to rapidly solidify material leaving the nozzle, and overhangs can therefore be printed more easily.

The inventors have further discovered that, in a large-scale extrusion deposition process, the overhang structure is usually of large scale. For example, in printing a vehicle using large-scale additive manufacturing, it may be necessary to print structures such as fenders and raised flat planes, and printing such structures presents problems. The amount of deformation of the overhang structure can be significant. Due to a great weight, breakage of the overhang structure is likely to occur. In contrast, in a smaller-scale extrusion deposition process, the overhang structure is smaller. Accordingly, amount of deformation of the overhang structure can be very small or negligible. With a low weight, the overhang structure can be less likely to break.

The inventors have further discovered that methods for making structures in smaller-scale additive manufacturing often do not apply to large-scale additive manufacturing. In one example, a support structure can be printed concurrently with the main part, and the overhang structure is subsequently printed on the support structure. However, in large-scale additive manufacturing, such a support structure costs significant resources such as material, print time, and energy consumption. Furthermore, properties of the support structure cannot be selected with flexibility, so removal of the support structure can be difficult. Even if the support structure is successfully removed without being damaged, the support structure is not reused, resulting in large quantities of waste.

In another example, an infill structure is positioned adjacent to the main part such that the overhang structure is subsequently printed on the infill structure. The infill structure remains as a part of the printed structure and is not removed. In large-scale additive manufacturing, size of the infill structure can be large and requirement on mechanical strength of the infill structure is high, so the infill structure cannot have very low density. The weight that the infill structure adds to the printed structure is significant, sometimes making the printed structure impractical to use.

Therefore, as discovered by the inventors, for making the overhang structure, the problem in large-scale additive manufacturing is different from and/or greater than the problem in smaller-scale additive manufacturing. Further, any methods for solving the problem in smaller-scale additive manufacturing may not be effective or practical in large-scale additive manufacturing.

In view of the foregoing, there is a need for improvements and/or alternative or additional solutions to improve additive manufacturing processes for making overhang structures and to produce overhang structures that are currently not possible to be made by additive manufacturing.

Figure 1:
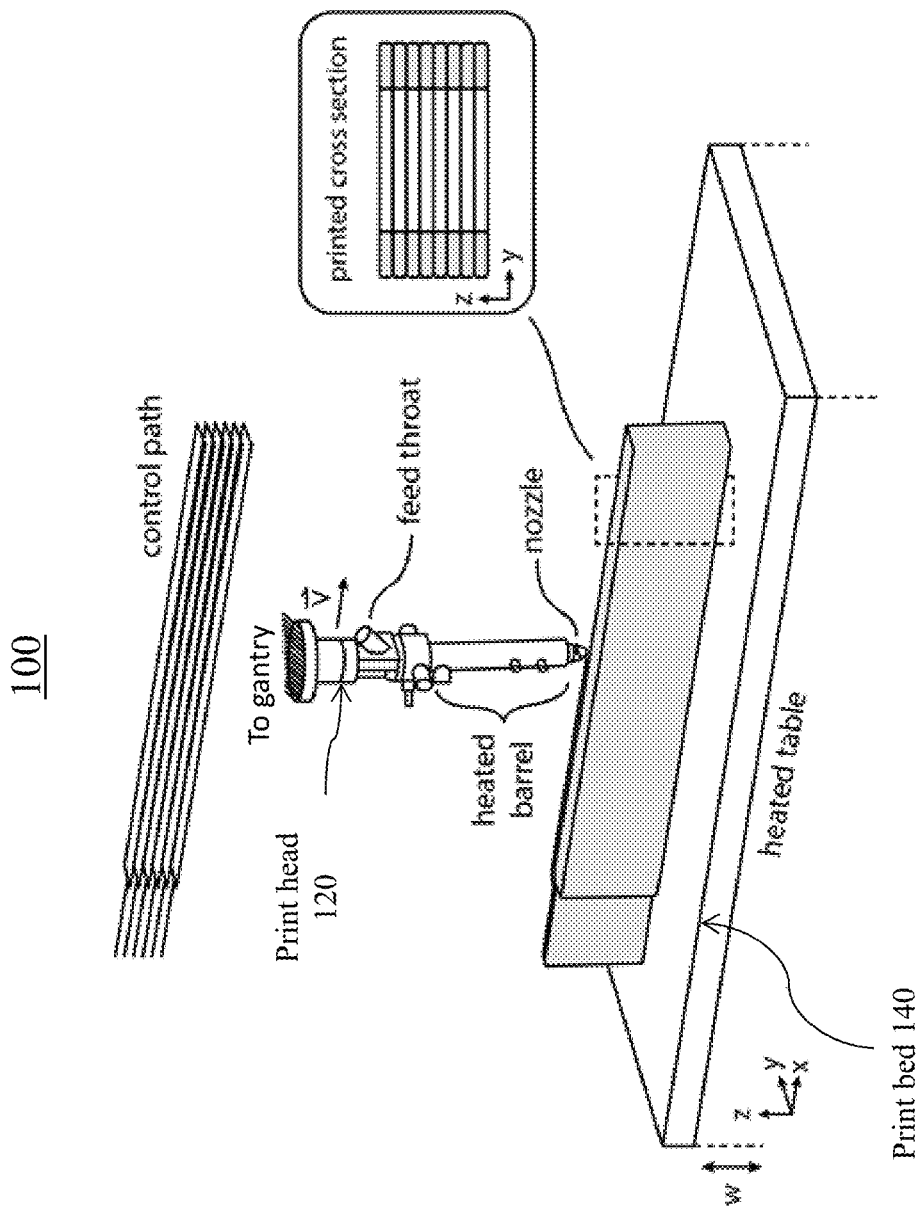
FIG. 1 is an exemplary diagram illustrating a system for additive manufacturing.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

FIG. 1 shows an exemplary system 100 for additive manufacturing. The system 100 can print 3D articles via extrusion deposition (or material extrusion). A print head 120 is shown as including a nozzle configured to deposit one or more polymer layers onto a print bed 140 to form the 3D printed article. The print bed 140 can include a heated table and/or previously deposited layers. The stacking direction of the layers is z-direction and the printing direction is the x-direction.

Although FIG. 1 shows additive manufacturing as being implemented by the system 100 using extrusion deposition, any other systems or processes for implementing additive manufacturing can be used in the present disclosure. Exemplary processes for additive manufacturing can include binder jetting, directed energy deposition, material jetting, powder bed fusion, sheet lamination, vat photopolymerization, stereolithography, or a combination thereof.

Since currently-available methods and systems are incapable of producing large-scale additively manufactured parts with strong overhang structures, additively manufactured structures with strong overhang structures and method for making the same can prove desirable and provide a basis for a wide range of applications, such as additive manufacturing for vehicles and/or architectural structures.

Although the structures and methods as set forth in the present disclosure are applied to solve technical problems in large-scale additive manufacturing, the structures and methods can be applied to any smaller-scale additive manufacturing, such as medium-scale and/or small-scale additive manufacturing, without limitation.

Figure 2:
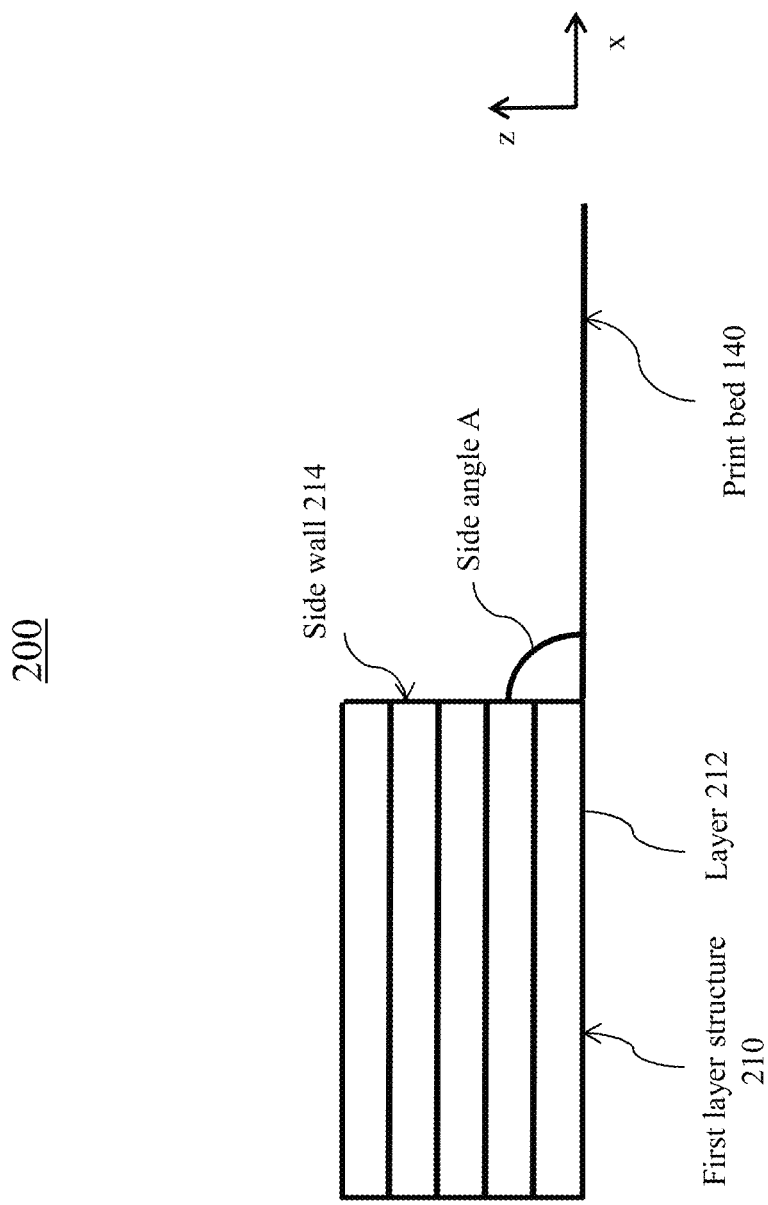
FIG. 2 is an exemplary cross-sectional diagram illustrating an embodiment of a structure during manufacturing using the system of FIG. 1, wherein the structure includes a first layer structure.

Turning to FIG. 2, a cross section of a structure 200 is shown. The structure 200 can include a first layer structure 210 including one or more layers (or first layers) 212 being stacked in the z direction. The first layer structure 210 can be manufactured using additive manufacturing.

The first layer structure 210 is shown as having a sidewall 214. The sidewall 214 is shown as being at a side angle A relative to the x-direction. Stated somewhat differently, the sidewall 214 is at the side angle A relative to the print bed 140.

Figure 3:
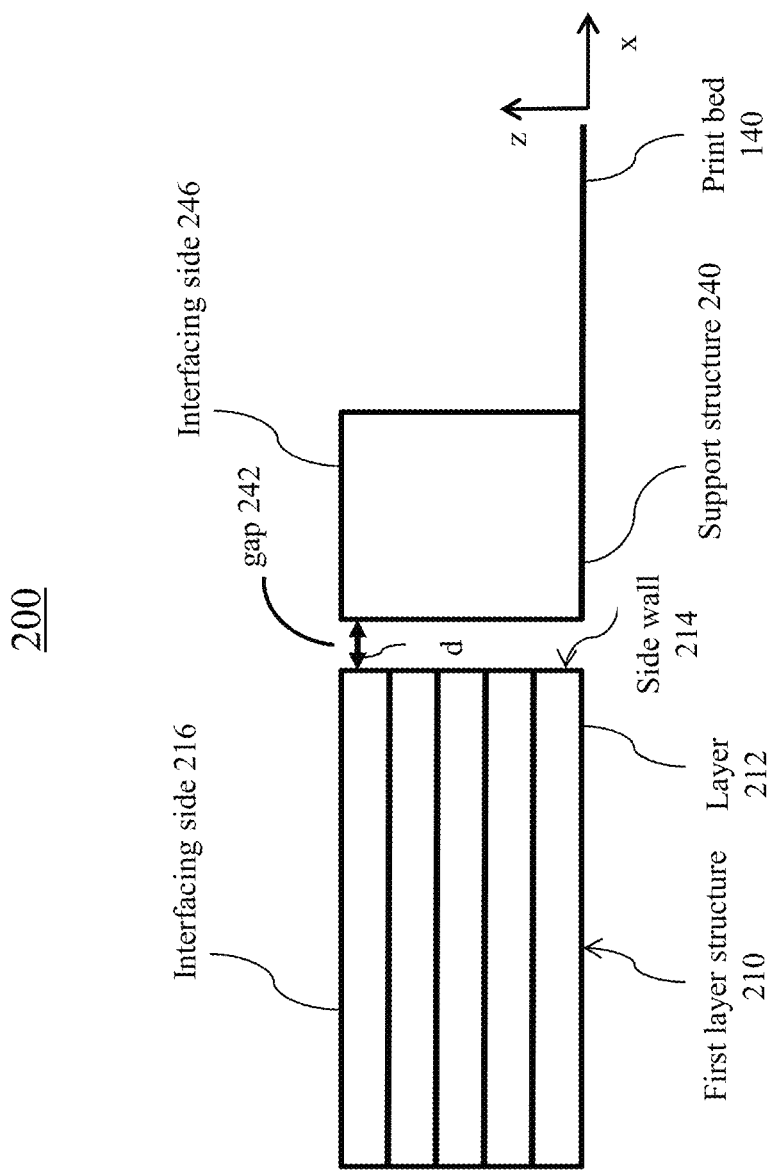
FIG. 3 is an exemplary cross-sectional diagram illustrating an alternative embodiment of the structure of FIG. 2 during manufacturing, wherein a support structure is positioned adjacent to the structure.

Turning to FIG. 3, a support structure 240 is positioned at a distance d from the sidewall 214. Although FIG. 3 shows the support structure 240 and the first layer structure 210 as being placed on the print bed 140, the support structure 240 and/or the first layer structure 210 can be positioned on any uniform and/or different planes, without limitation.

The support structure 240 is shown as having an interfacing side 246 that is distal to the print bed 140. The first layer structure 210 can include an interfacing side 216 distal to the print bed 140. As shown in FIG. 3 for illustrative purposes, the interfacing side 216, 246 can be coplanar. However, the interfacing side 216, 246 are not necessarily coplanar and can be non-coplanar, without limitation. Stated somewhat differently, the interfacing side 216, 246 can be at uniform and/or different distances from the print bed 140.

The distance d can be spacing between any points on the first layer structure 210 and the support structure 240. As illustratively shown in FIG. 3, the distance d can be size of a gap 242 between the interfacing sides 246, 216. Stated somewhat differently, the distance d can be the spacing measured between regions of the support structure 240 and the first layer structure 210 that subsequent layers can be printed on.

FIG. 3 shows the gap 242 to be uniform for illustrative purposes only. The gap 242 can be uniform and/or different at various locations along the sidewall 214. For example, the sidewall 214 can have a curved, slanted and/or irregular shape, resulting in a non-uniform gap 242 and a non-uniform distance d along the sidewall 214. In one example, the distance d can be zero and/or non-zero at different locations. In other words, the sidewall 214 can be partially in contact with the support structure 240.

The support structure 240 can have any selected shape and size. The support structure 240 can be made using any suitable materials and processes. In one embodiment, the support structure 240 can be made using 3D printing. Advantageously, 3D printing can make the support structure 240 that has complex contour. In one example, the support structure 240 can be printed on the print bed 140 and placed upside down during usage. Advantageously, the support structure 240 can provide the interfacing side 246 that is planar.

Additionally and/or alternatively, the support structure 240 can be at least partially made of foam. The foam can be machined to obtain selected size and shape. Advantageously, the support structure 240 can be made in a less expensive manner.

Although FIG. 3 shows the first layer structure 210 and the support structure 240 having the gap 242 in a plane defined by z- and x-directions, the first layer structure 210 and the support structure 240 can be separated and/or in contact in a plane defined by z- and y-directions and/or any other planes, without limitation.

Figure 4:
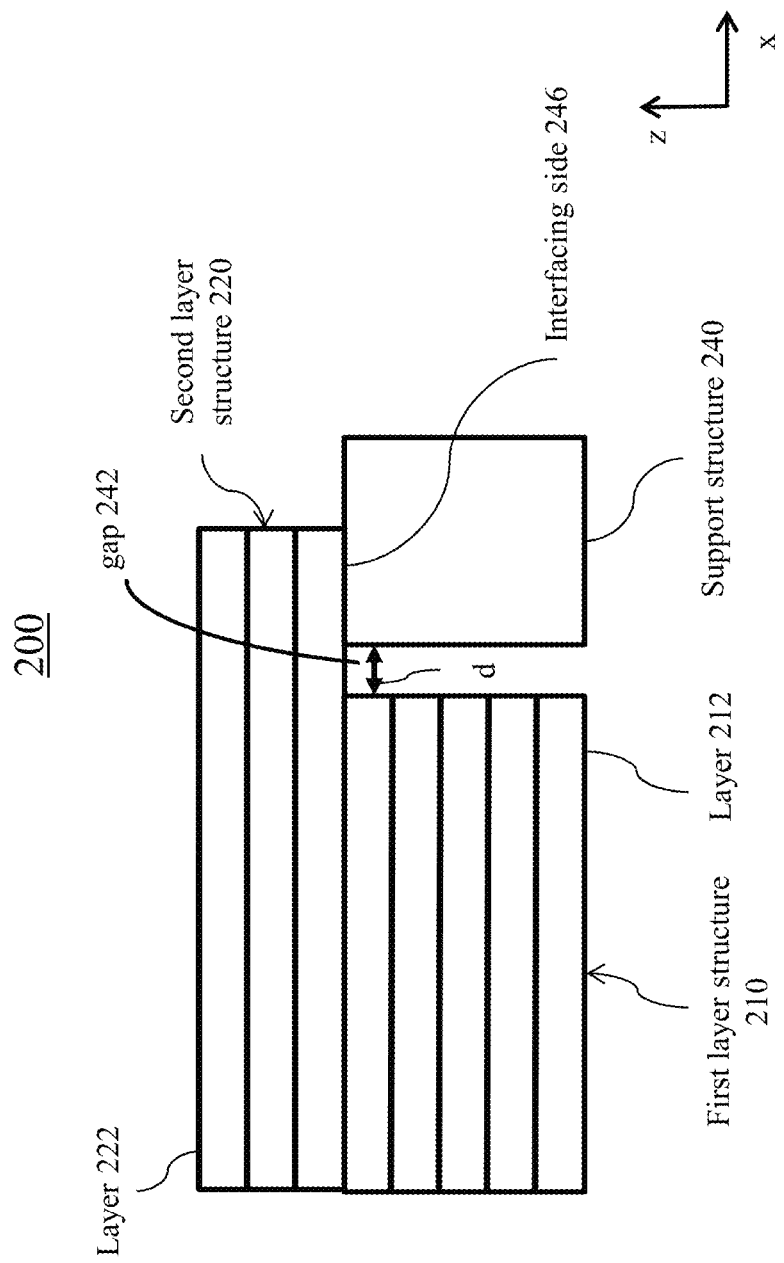
FIG. 4 is an exemplary cross-sectional diagram illustrating an alternative embodiment of the structure of FIG. 3 during manufacturing, wherein a second layer structure is printed on the support structure.

Turning to FIG. 4, a second layer structure 220 is shown as being disposed on the support structure 240 and the first layer structure 210. The second layer structure 220 is shown as including one or more layers (or second layers) 222 being stacked in the z direction. In one embodiment, the second layer structure 220 can be manufactured using the same additive manufacturing techniques that manufactures the first layer structure 210.

The second layer structure 220 is shown as spanning the gap 242. The distance d can be any suitable lengths. A small distance d can advantageously reduce possibility of deformation of the second layer structure 220 that spans the gap. The distance d can be determined by bridging capability of the second layer structure 220, that is, ability of the material of the second layer structure 220 to overhang without any support in a vertical direction from space below the second layer structure 220. In one embodiment, the distance d can be zero. Advantageously, the second layer structure 220 can be fully supported during printing and deformation can be reduced or prevented.

Figure 5:
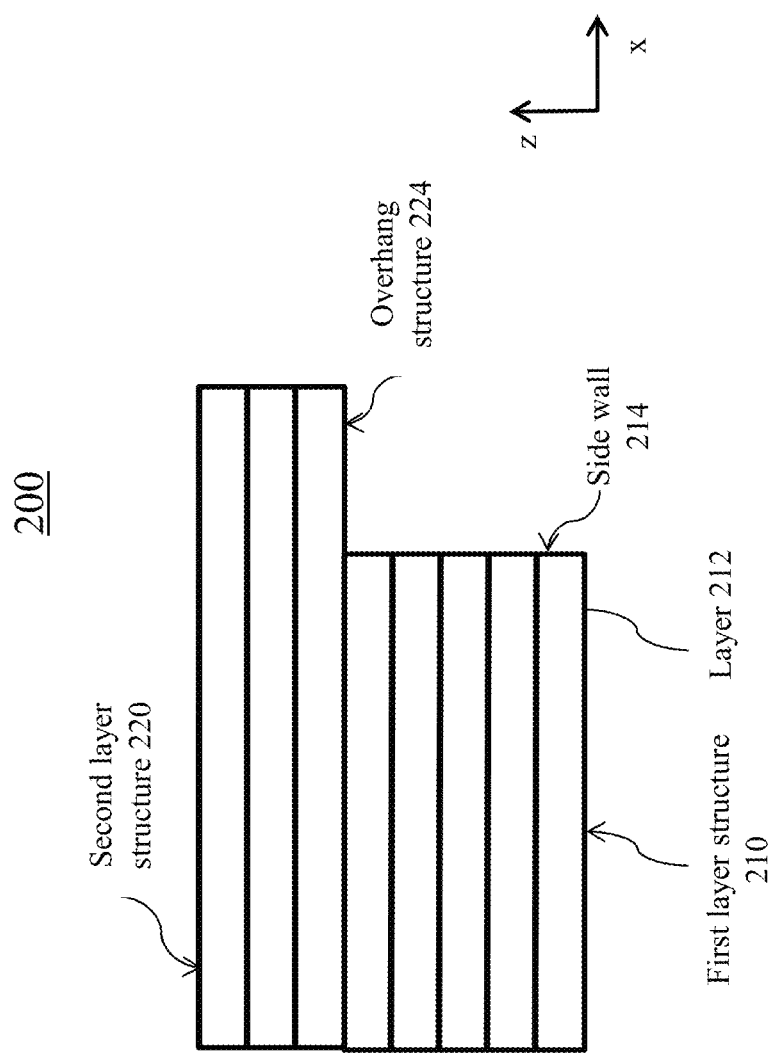
FIG. 5 is an exemplary cross-sectional diagram illustrating an alternative embodiment of the structure of FIG. 4 during manufacturing, wherein the support structure is removed from the second layer structure.

Turning to FIG. 5, the support structure 240 is shown as being removed from the second layer structure 220. The portion of the second layer structure 220 that extends beyond the first layer structure 210 is an overhang structure 224.

The overhang structure 224 can maintain shape before and after removal of the support structure 240. Stated somewhat differently, even though being unsupported and positioned on empty space, the overhang structure 224 does not deform or break away from the second layer structure 220 under gravity.

Figure 6:
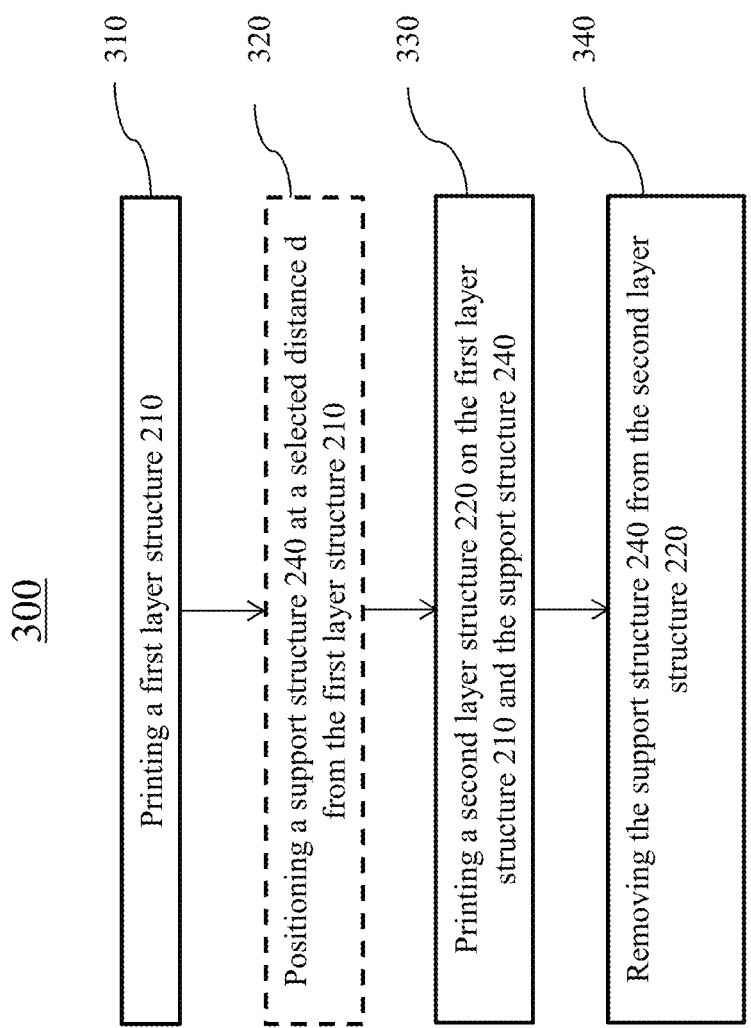
FIG. 6 is an exemplary top-level flow chart illustrating an embodiment of a method for additive manufacturing based on the system of FIG. 1.

Turning to FIG. 6, an exemplary method 300 of manufacturing the structure 200 (shown in FIG. 5) is shown. The first layer structure 210 can be printed, at 310. The second layer structure 220 can be printed, at 330, on the support structure 240 and the first layer structure 210.

The support structure 240 can be removed, at 340, from the second layer structure 220. Removing the support structure 240 from the second layer structure 220 can include detaching the support structure 240 from direct contact with the second layer structure 220. The support structure 240 can be removed at any suitable time. In one embodiment, the second layer structure 220 can be cooled to room temperature and/or solidified before the support structure 240 is removed from the second layer structure 220. Advantageously, the support structure 240 can provide support to the second layer structure 220 during the cooling and/or solidification to avoid deformation of the second layer structure 220. Upon completion of the cooling and/or solidification, the second layer structure 220 can gain sufficient structural strength and does not deform even after the support structure 240 is removed.

Advantageously, the support structure 240 can be reused for repeatedly making the structure 200. The reuse can significantly save material, printing time and energy. Furthermore, because the support structure 240 can be separated from the structure 200, the support structure 240 can be made with materials with a high density to provide sufficient strength to support the second layer structure 220 but still does not increase weight of the structure 200.

Optionally, the support structure 240 can be positioned, at 320, at the selected distance d from the first layer structure 210. In one embodiment, the support structure 240 can be positioned after printing the first layer structure 210 and before printing the second layer structure 220. For example, the printing process can have a pause or time interval after printing the first layer structure 210 and before printing the second layer structure 220. The support structure 240 can be positioned during the time interval manually by an operator and/or in a machine-assisted manner (for example, robotically). Advantageously, the support structure 240 does not impede the process of printing the first layer structure 210. Additionally and/or alternatively, the support structure 240 can be placed prior to finishing the printing of the first layer structure 210. The process of positioning the support structure 240 can be significantly shorter than the process of printing the first layer structure 210.

Figure 7:
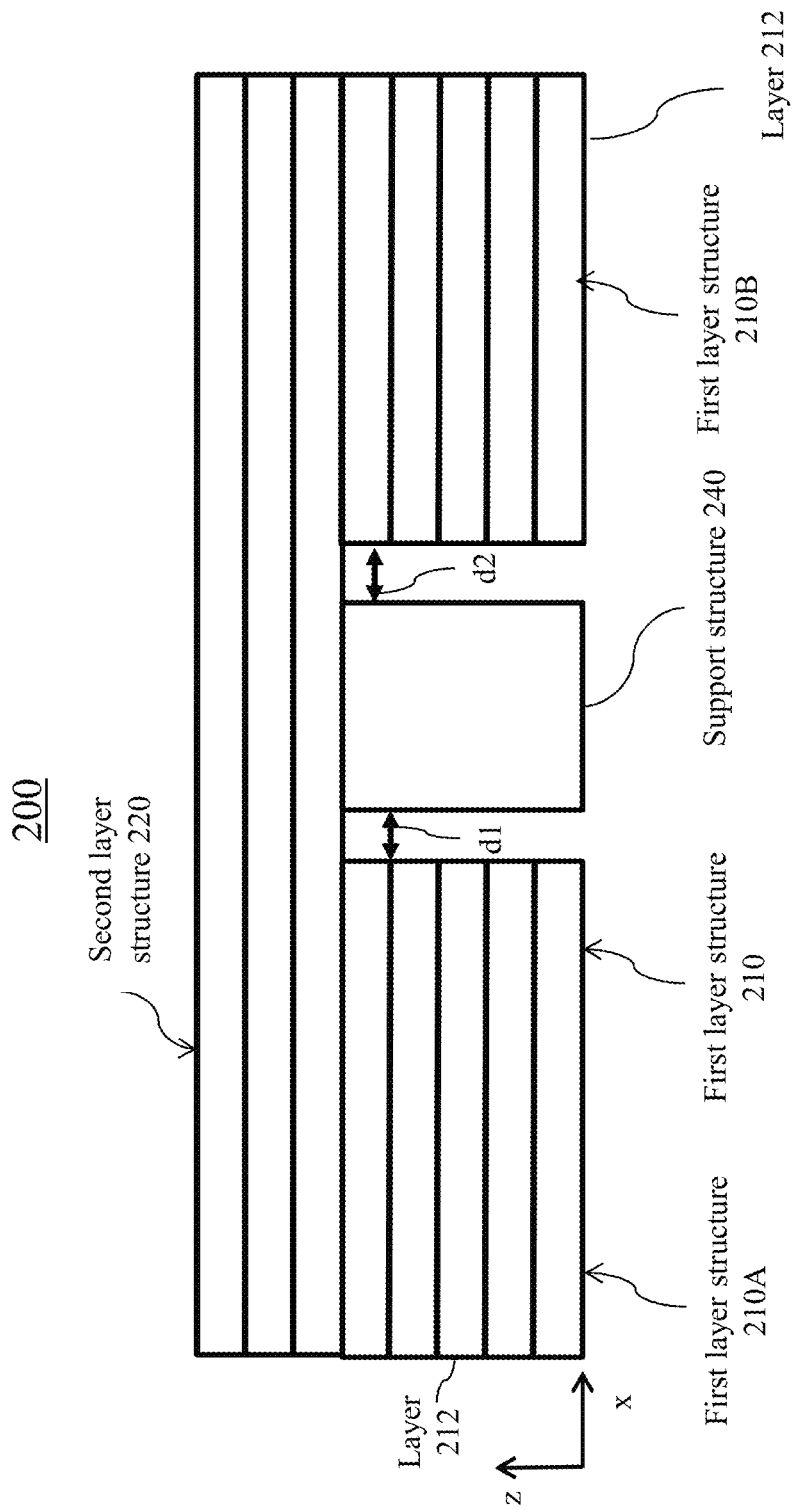
FIG. 7 is an exemplary cross-sectional diagram illustrating an alternative embodiment of the structure of FIG. 4, wherein the support structure is between two first layer structures.

Turning to FIG. 7, the first layer structure 210 is shown as including first layer structures 210A, 210B. Each of the first layer structures 210A, 210B is shown as including one or more layers 212 being stacked in the z direction. The first layer structures 210A, 210B can include uniform and/or different numbers of the layers 212. In one embodiment, the first layer structures 210A, 210B can include the same number of the layers 212. Advantageously the first layer structures 210A, 210B can be printed concurrently, and surfaces of the first layer structures 210A, 210B that are exposed to subsequent printing layers can be flush and/or co-planar.

FIG. 7 shows the support structure 240 as being located between the first layer structures 210A, 210B. The support structure 240 is shown as being at distances d1, d2 from the first layer structures 210A, 210B, respectively. The distances d1, d2 can be uniform and/or different. FIG. 7 shows the second layer structure 220 as being disposed on the first layer structures 210A, 210B and the support structure 240.

Figure 8:
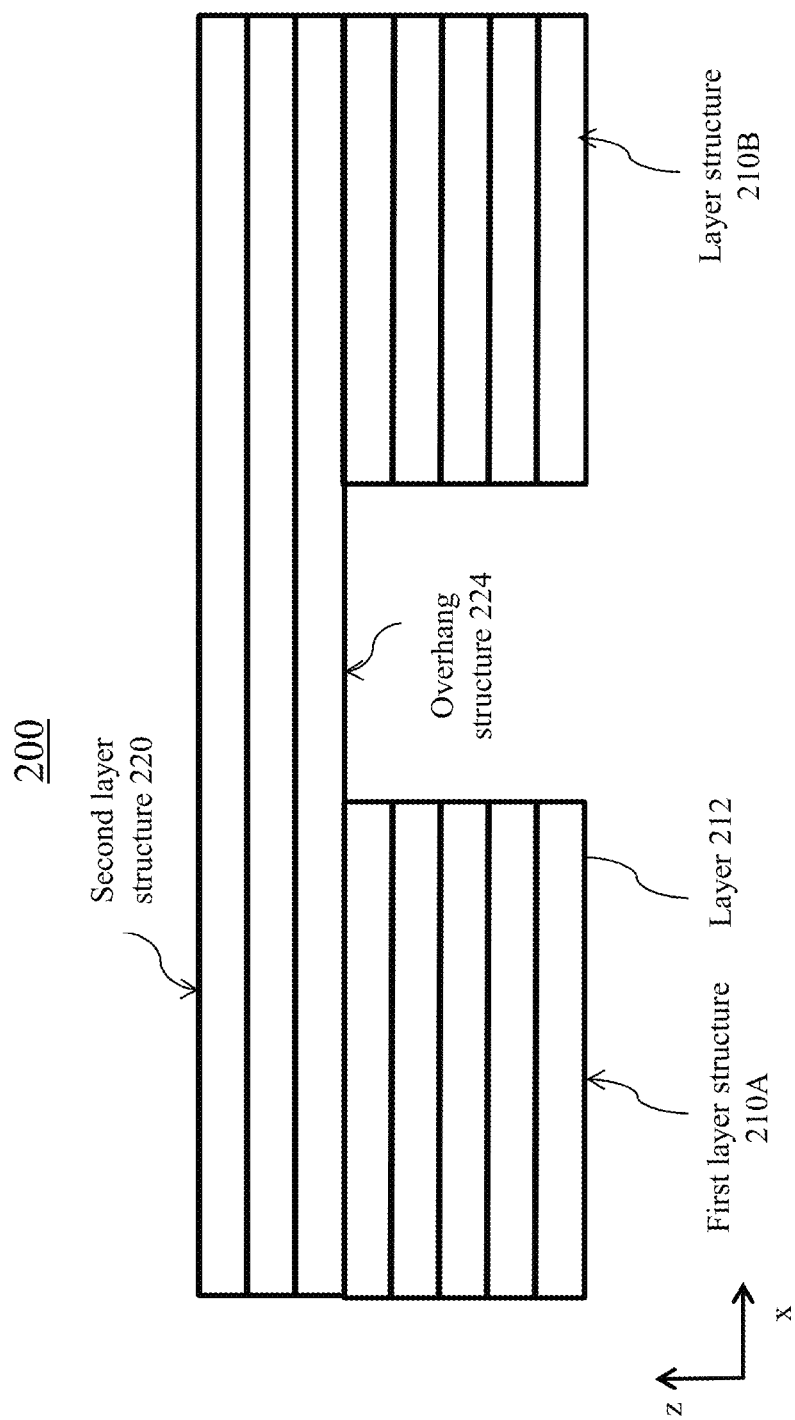
FIG. 8 is an exemplary cross-sectional diagram illustrating an alternative embodiment of the structure of FIG. 7, wherein the support structure is removed from the second layer structure.

Turning to FIG. 8, the support structure 240 is shown as being removed from the support structure 240. The overhang structure 224 is shown as spanning between the first layer structures 210A, 210B. The overhang structure 224 can maintain shape before and after removal of the second layer structure 220. Stated somewhat differently, the overhang structure 224 can bridge the first layer structures 210A, 210B.

Figure 9:
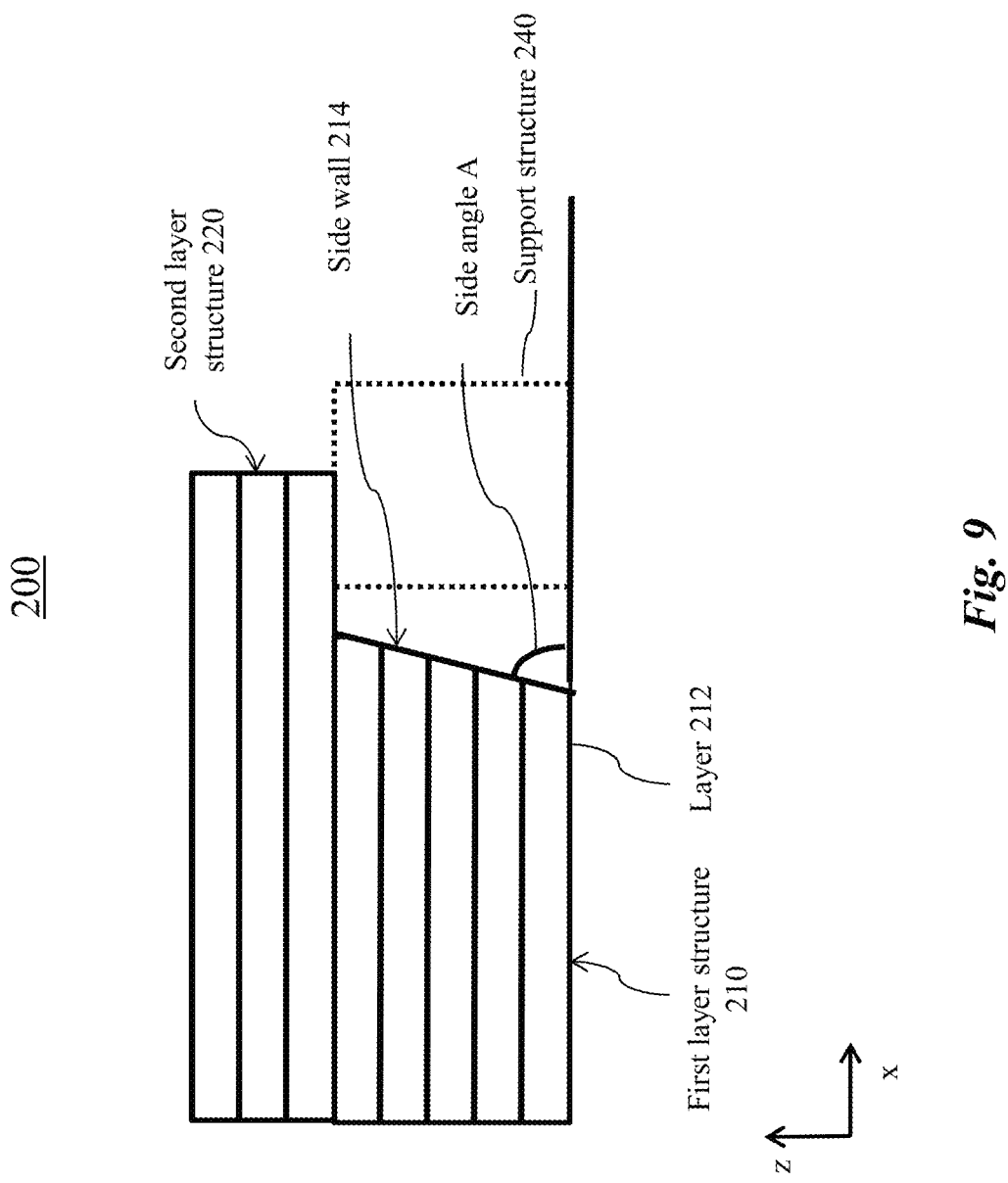
FIG. 9 is an exemplary cross-sectional diagram illustrating an alternative embodiment of the structure of FIG. 5, wherein the first layer structure has a tilted sidewall.

Turning to FIG. 9, the side wall 214 of the first layer structure 210 is shown as being a surface that tilts away from the z-direction. Stated somewhat differently, the side angle A is not a right angle. FIG. 9 shows the side angle A as being smaller than 90 degrees.

The side angle A can have any suitable values. The minimum value of the side angle A can be determined by the printing process. In one embodiment, when beads (not shown) for printing the first layer structure 210 are wide, the side angle A can be small. For example, when the beads have a great aspect ratio, the side angle A can be small. The aspect ratio can include a width (or size in x-direction) to height (or size in z-direction) ratio of the bead. Additionally and/or alternatively, when there is great solidification time between the layers 212, the side angle A can be small. An exemplary side angle A can range from 35 degrees to 90 degrees, from 40 degrees to 90 degrees, or from 45 degrees to 90 degrees.

Figure 10:
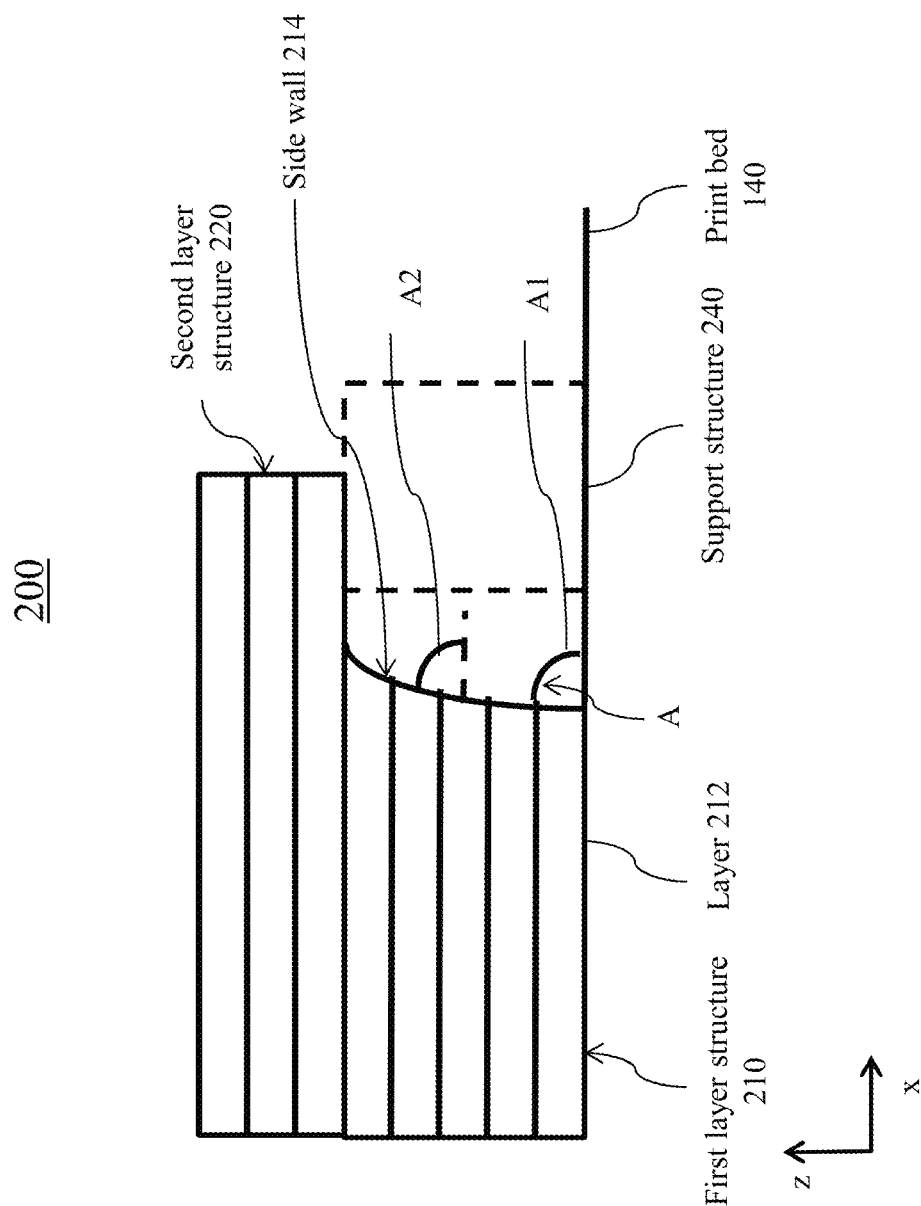
FIG. 10 is an exemplary cross-sectional diagram illustrating another alternative embodiment of the structure of FIG. 5, wherein the first layer structure has a curved sidewall.

Turning to FIG. 10, the side wall 214 of the first layer structure 210 is shown as including a curved surface tilting away from the z-direction. The side wall 214 can have a plurality of side angles A at respective locations along the side wall 214. As illustrated in FIG. 10, the side angles A are shown as including a side angle A1 at an end region of the side wall 214 and a side angle A2 at a middle region of the side wall 214.

The minimum value of each of the side angles A1, A2 can be determined by the bridging capability of the first layer structure 210. In one embodiment, when beads (not shown) for printing the first layer structure 210 are wide, the side angles A1, A2 can be small. For example, when the beads have a great aspect ratio, the side angles A1, A2 can be small. The aspect ratio can include a width (or size in x-direction) to height (or size in z-direction) ratio of the bead. Additionally and/or alternatively, when there is great solidification time between the layers 212, the side angles A1, A2 can be small. Exemplary side angles A1, A2 can each range from 35 degrees to 90 degrees, from 40 degrees to 90 degrees, or from 45 degrees to 90 degrees.

Although the side wall 214 is shown as being straight in FIG. 9 and curved in FIG. 10, the side wall 214 can be straight, curved, or a combination thereof, without limitation.

Figure 11:
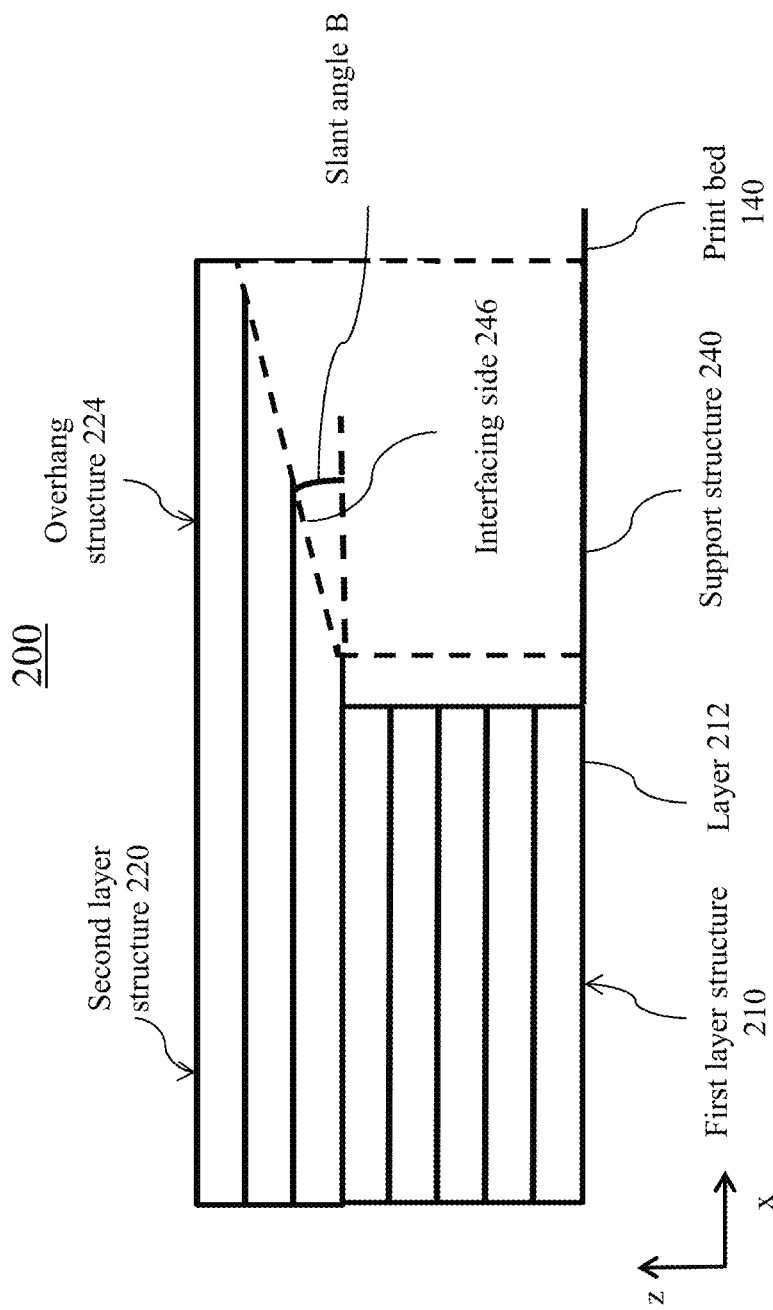
FIG. 11 is an exemplary cross-sectional diagram illustrating another alternative embodiment of the structure of FIG. 5, wherein the second layer structure has a slant angle.

Turning to FIG. 11, the interfacing side 246 is shown as interfacing with the second layer structure 220. Morphology and/or shape of the interfacing side 246 can determine the second layer structure 220 that is printed on the support structure 240.

FIG. 11 shows a slant angle B as existing between the interfacing side 246 and the print bed 140. Effectively, the overhang structure 224 formed on the support structure 240 can have a side wall at the slant angle B relative to the print bed 140.

The slant angle B can have any suitable values. In one embodiment, the slant angle B can have a value that is difficult and/or impossible to achieve in 3D printing without using the support structure 240. An exemplary slant angle B can range from 0 degrees to 45 degrees. Advantageously, when the second layer structure 220 is made of a material that has limited bridging capability and cannot form the slant angle B at a small value without any support, the support structure 240 can provide support to make such small slant angle B feasible.

In one embodiment, the slant angle B can be zero. The interfacing side 246 can thus be parallel to the print bed 140. For example, the interfacing side 246 can be co-planar with the interfacing side 216 (shown in FIG. 3) of the first layer structure 210.

Figure 12:
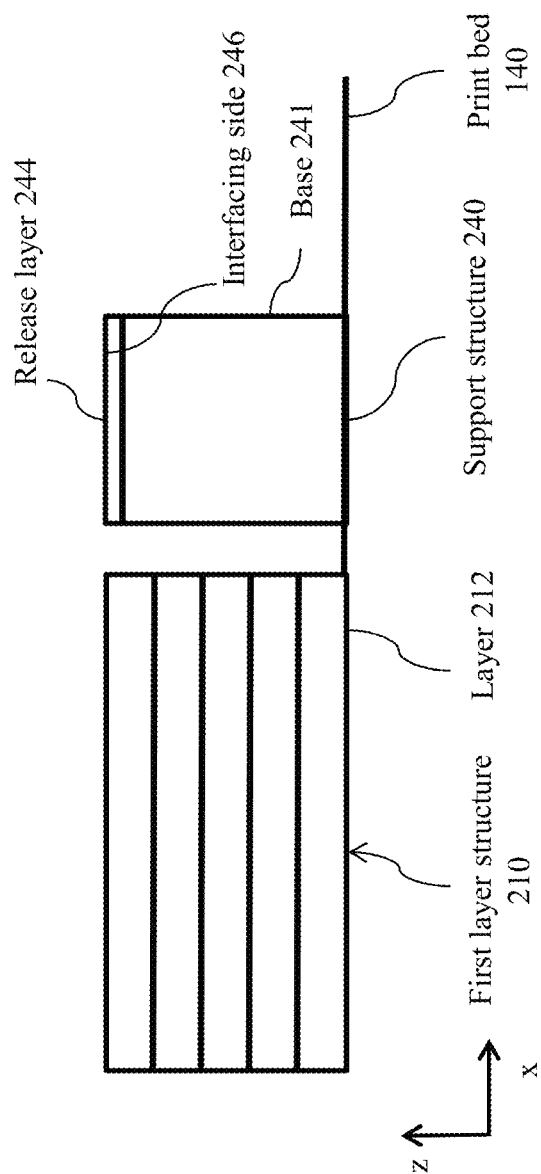
FIG. 12 is an exemplary cross-sectional diagram illustrating an alternative embodiment of the structure of FIG. 3, wherein the support structure includes a release layer.

Turning to FIG. 12, the support structure 240 is shown as including a release layer 244 disposed on a base 241 and providing the interfacing side 246. The release layer 244 can be disposed before the second layer structure 220 (shown in FIG. 4) is printed on the support structure 240.

The release layer 244 can be used to prevent tight bonding between the second layer structure 220 and the support structure 240. Advantageously, after the second layer structure 220 is cooled and/or solidified, the support structure 240 can be removed from the second layer structure 220 without damaging the second layer structure 220. Additionally and/or alternatively, the release layer 244 can be used for providing sufficient adhesion between the second layer structure 220 and the support structure 240 during printing of the second layer structure 220. Advantageously, the second layer structure 220 can be fixed to the support structure 240 to prevent positional shift between the second layer structure 220 and the support structure 240. An exemplary release layer 244 can include a non-sticking material. For example, the release layer 244 can include talcum powder, mica dust, oil, such as cooking oil, and/or mold release material. Alternatively and/or additionally, the release layer 244 can be at least partially made of soapstone. For example, the release layer 244 can be applied by using a soapstone marker. Advantageously, application of the release layer 244 can be a cleaner process than applying loose powder.

Additionally and/or alternatively, the release layer 244 can include a sheet and/or a coating providing the properties as set forth above. Exemplary sheet can include acrylonitrile butadiene styrene (ABS) sheet, other thermoplastic sheets, cloth fabric coated in contact adhesive, bead boards, medium-density fibreboard (MDF) board covered in wood glue (or bead board without the pellets sprinkled on top of the bead board), foam inserts, cardboard, or a combination thereof.

Although FIG. 12 shows the release layer 244, desired surface interaction between the second layer structure 220 and the support structure 240 can be achieved without the release layer 244. In one embodiment, the second layer structure 220 and the support structure 240 can be made of materials that are different. For example, the second layer structure 220 and the support structure 240 can be made of first and second materials, respectively. The first and second materials can have chemical and/or physical properties of sufficient difference to achieve advantageous interface interactions that are the same as and/or greater than the interactions provided by talcum powder.

In one embodiment, each of the first and second materials can include ABS, carbon fiber-filled ABS (CF/ABS), polycarbonate, polyamide, poly(p-phenylene oxide) (PPO), poly (p-phenylene ether) (PPE), or a combination thereof. For example, the CF/ABS can include discontinuous carbon fiber composite such as 20% chopped carbon fiber-filled acrylonitrile butadiene styrene (20% CF/ABS). Additionally and/or alternatively, the first material can include ABS and/or co-polyester, and can be filled with carbon fibers and/or graphene nanofillers. The second material can be different from the first material. In one example, the first material can include ABS, and the second material can include PPO.

Additionally and/or alternatively, the first and second materials can have different temperatures during printing of the second layer structure 220 on the support structure 240. The temperature difference between the first and second materials can facilitate release between the first and second materials when the first material is the same as, or different from, the second material. For example, the first and second materials can include the same materials but a temperature of the second material can be lower than a temperature of the first material during printing of the second layer structure 220. Advantageously, desired release properties between the second layer structure 220 and the support structure 240 can be achieved.

Figure 13:
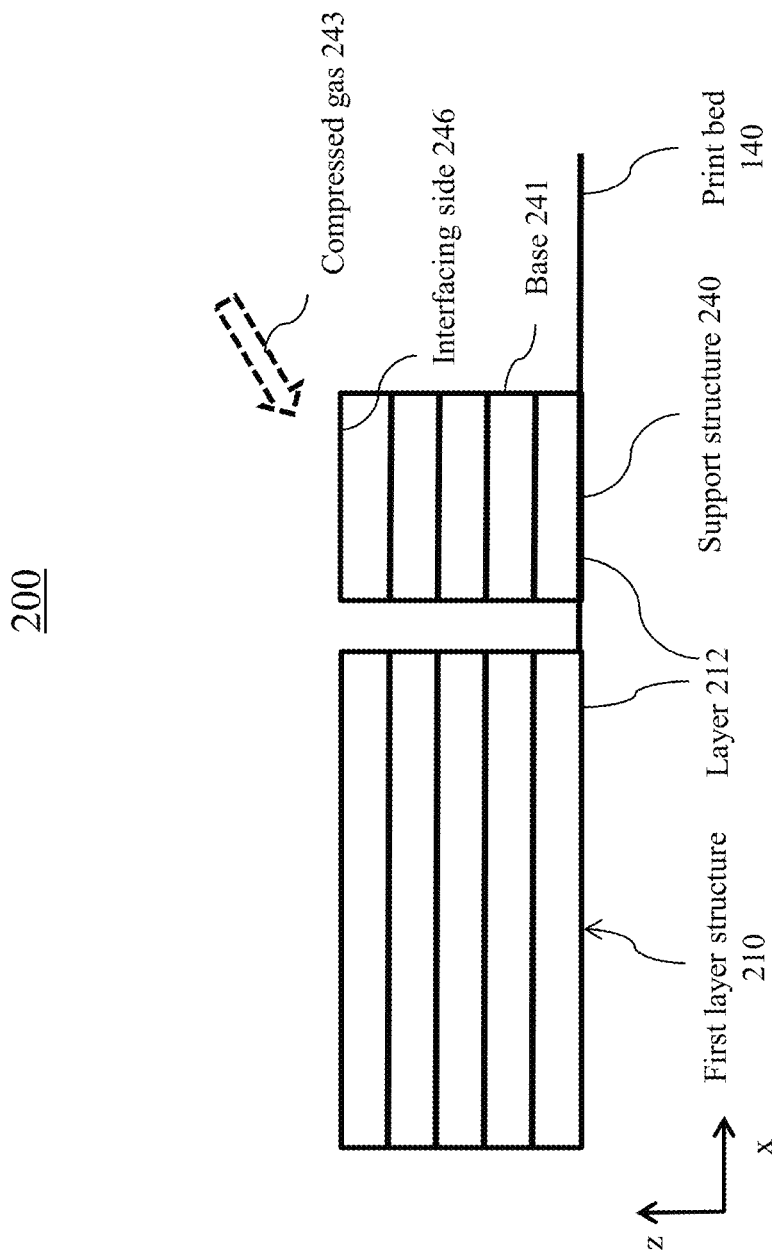
FIG. 13 is an exemplary cross-sectional diagram illustrating an alternative embodiment of the structure of FIG. 3, wherein compressed gas is sprayed onto the support structure.

Turning to FIG. 13, the support structure 240 is shown as including one or more layers 212 being stacked in the z direction. In one embodiment, the support structure 240 can be made using additive manufacturing. For example, the support structure 240 can be made using 3D printing and concurrently with the first layer structure 210. Stated somewhat differently, a computerized model can be generated to include the first layer structure 210 and the support structure 240, and the first layer structure 210 and the support structure 240 can be printed in one printing process.

FIG. 13 shows that compressed gas 243 can optionally be sprayed on the support structure 240 to reduce the temperature of the support structure 240 during and/or before the printing of the second layer structure 220 (shown in FIG. 4). The compressed gas 243 can include any gas kept under a pressure that is greater than atmospheric pressure. Exemplary compressed gas 243 can include compressed air, liquid nitrogen, or a combination thereof.

The newly printed support structure 240 can have the interfacing side 246 that is at a high temperature. The compressed gas 243 can cool down the interfacing side 246. The second layer structure 220 can, at a temperature higher than the temperature of the interfacing side 246, be printed on the support structure 240 and be easily released subsequently even though the release layer 244 (shown in FIG. 12) is not applied to the support structure 240. Advantageously, the first layer structure 210 is not cooled down by the compressed gas 243, so good adhesion between the first and second layer structures 210, 220 can be achieved.

Figure 14:
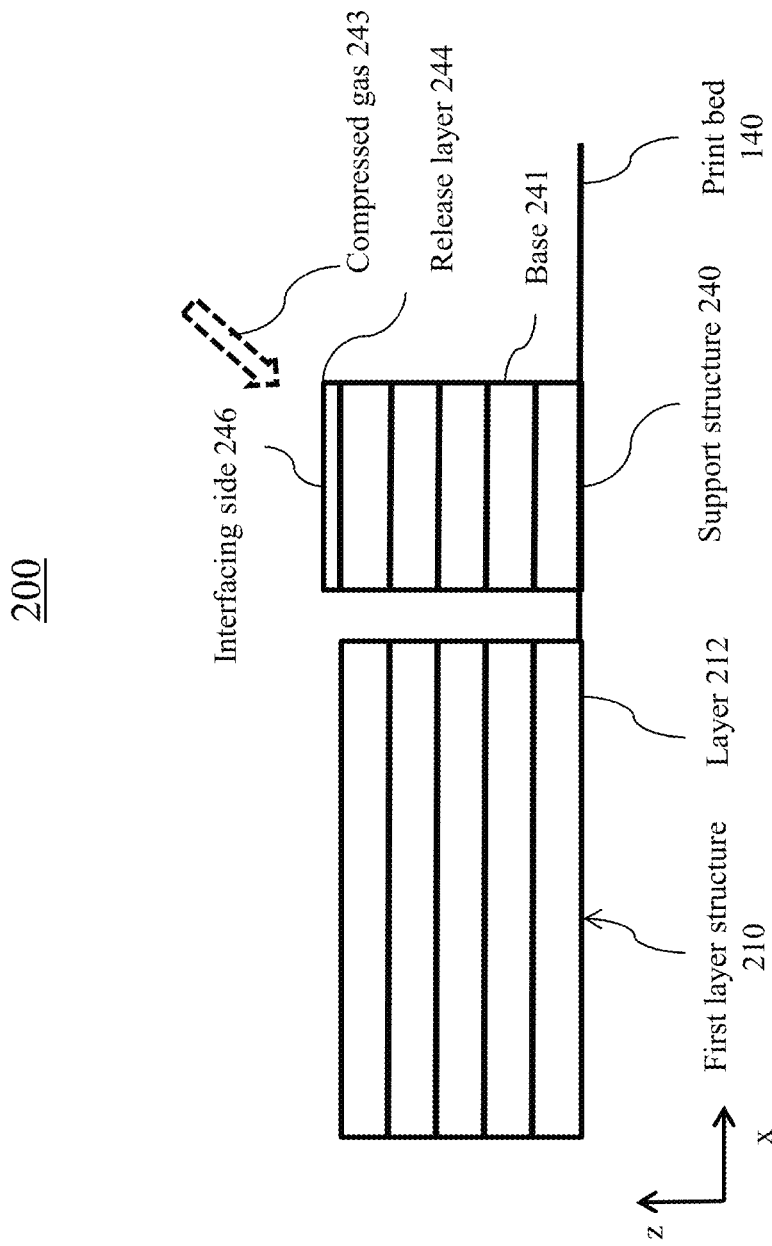
FIG. 14 is an exemplary cross-sectional diagram illustrating an alternative embodiment of the structure of FIG. 13, wherein the support structure includes a release layer.

Turning to FIG. 14, the compressed gas 243 is shown as being, optionally, sprayed on the support structure 240 to reduce the temperature of the support structure 240. For example, the support structure 240 can be made via additive manufacturing, and the newly printed support structure 240 can be at a high temperature. The compressed gas 243 can reduce the temperature of the support structure 240.

The release layer 244 can be applied to the support structure 240. The release layer 244 can be made of soapstone, talcum powder and/or any other materials that can facilitate release of the support structure 240. The second layer structure 220 can, at a temperature higher than the temperature of the support structure 240, be printed on the support structure 240. Advantageously, the second layer structure 220 can be more easily released from the support structure 240.

Figure 15:
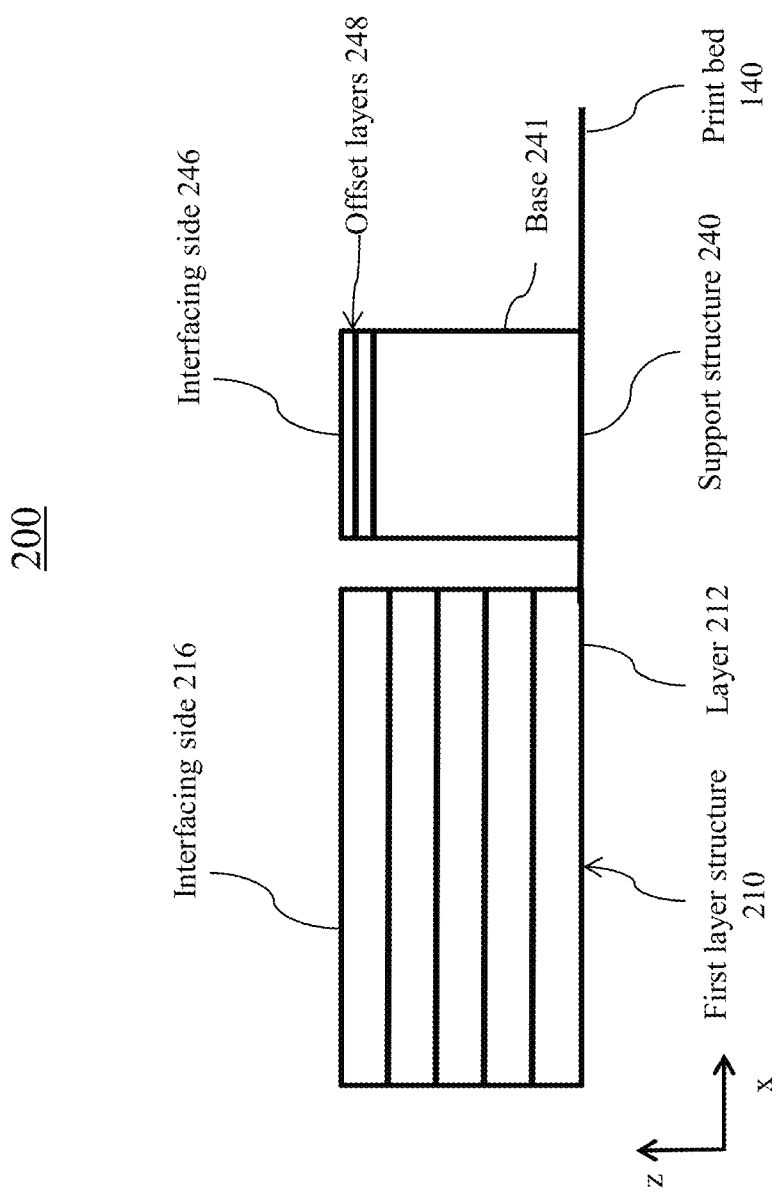
FIG. 15 is an exemplary cross-sectional diagram illustrating another alternative embodiment of the structure of FIG. 3, wherein the support structure includes one or more offset layers.

Turning to FIG. 15, the support structure 240 is shown as including one or more offset layers 248 disposed distal to the print bed 140. The offset layers 248 can have uniform and/or different thicknesses and/or morphologies. The offset layers 248 can be selected to tune a height and/or shape of the support structure 240 such that the interfacing side 246 can be at a desired position relative to the first layer structure 210. For example, the offset layers 248 can be selected such that the interfacing side 246 of the support structure 240 is co-planar with the interfacing side 216 of the first layer structure 210.

When the support structure 240 is re-used in multiple printing processes, the first layer structures 210 in each printing process can have different degrees of deformation, resulting in different shapes and/or thicknesses. By fixing selected offset layers 248 on the support structure 240, size, thickness, and/or shape of the support structure 240 can advantageously be adjusted to precisely match, and/or be aligned with, geometry of each of the first layer structures 210.

The offset layers 248 can be made of a third material. The second and third materials can be uniform and/or different. For example, the offset layers 248 can be made of foam and can be shaped to be similar to a shim.

Although FIG. 15 shows two offset layers 248 for illustrative purposes only, the support structure 240 can include one or more offset layers 248 having uniform and/or different geometry, without limitation. Although FIG. 15 shows the offset layers 248 being stacked in z-direction, the offset layers 248 can be arranged in any directions, without limitation.

Figure 16:
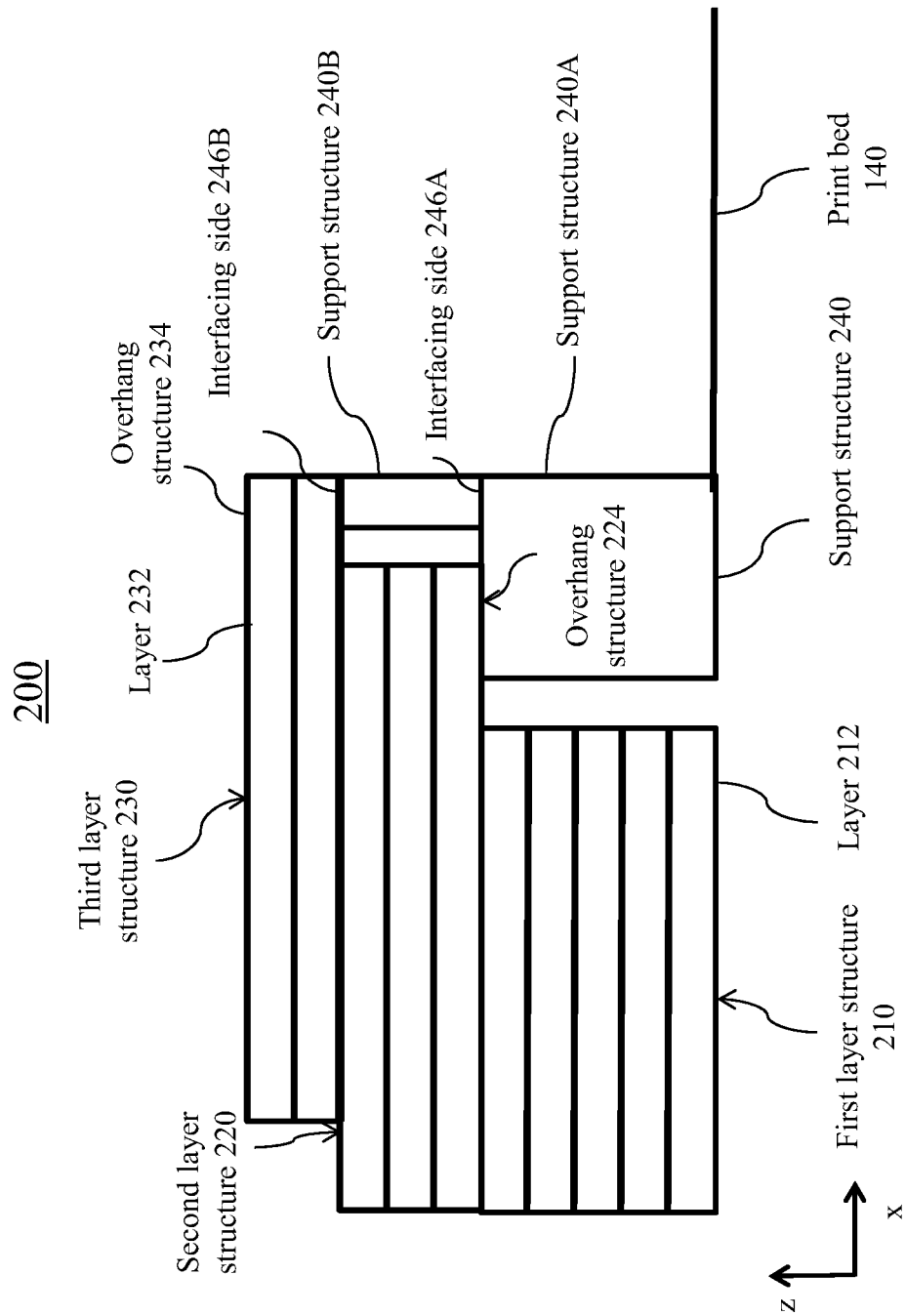
FIG. 16 is an exemplary cross-sectional diagram illustrating an alternative embodiment of the structure of FIG. 4, wherein the structure includes a third layer structure.

Turning to FIG. 16, the support structure 240 is shown as including a support structure (or a first support structure) 240A and a support structure (or a second support structure) 240B stacked on the support structure 240A. The support structure 240B is shown as having an interfacing side 246B that is more distal to the print bed 140 than an interfacing side 246A of the support structure 240A. The structure 200 is shown as including a third layer structure 230 formed on the second layer structure 220 and on the support structure 240B. The third layer structure 230 is shown as including one or more layers (or third layers) 232 being stacked in the z direction. Upon removal of the support structure 240, overhang structures 224, 234 can be formed.

Although FIG. 16 shows the support structure 240B as being stacked on the support structure 240A, the support structure 240B can be located on any surface, such as the print bed 140 and/or on any previously-printed layers, without limitation. Although FIG. 16 shows support structures 240A, 240B, any number of support structures 240 of uniform and/or different thicknesses and/or shapes can be used.

Figure 17:
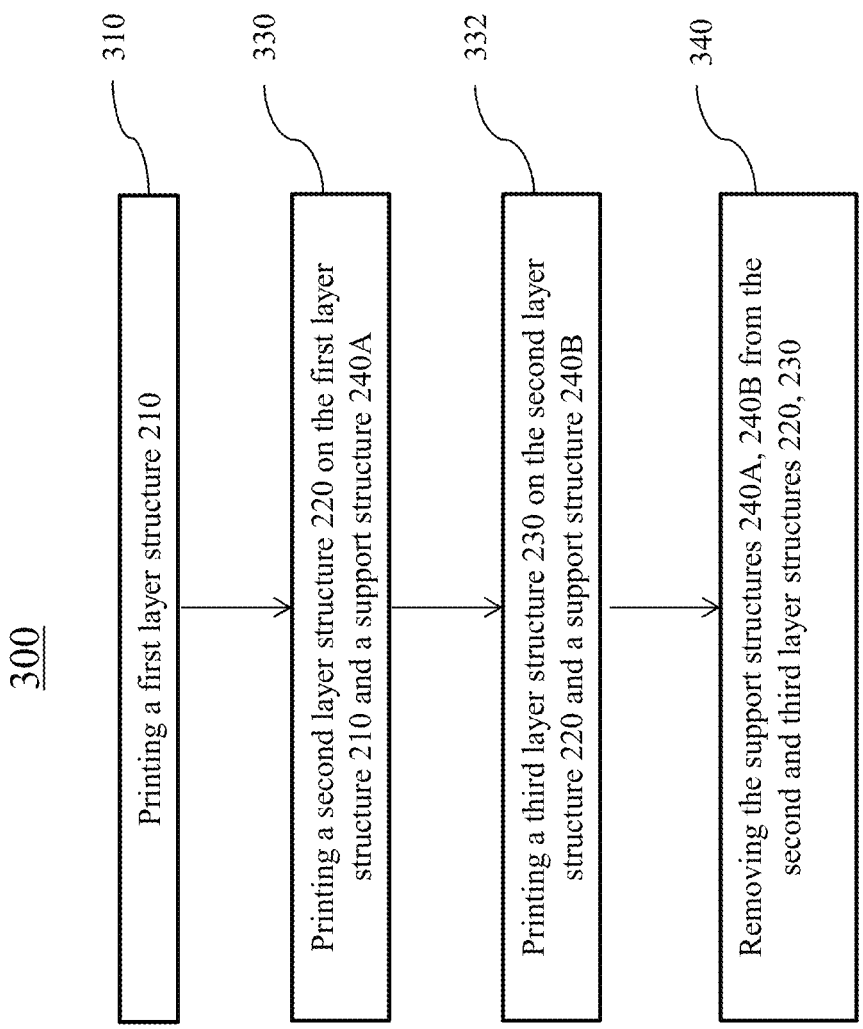
FIG. 17 is an exemplary flow chart illustrating an alternative embodiment of the method for additive manufacturing of FIG. 6.

Turning to FIG. 17, the exemplary method 300 of manufacturing the structure 200 (shown in FIG. 16) is shown. The first layer structure 210 can be printed, at 310. The second layer structure 220 can be printed, at 330, on the first layer structure 210 and the support structure 240A. The third layer structure 230 can be printed, at 332, on the second layer structure 220 and the support structure 240B. The support structures 240A, 240B can be removed, at 340, from the second and third layer structures 220, 230.

Stated somewhat differently, the printing at 330 can be repeatedly performed, as shown at 332, by positioning additional support structures 240 to print on, to create multiple overhang structures at different height and/or distances from the print bed 140 (shown in FIG. 16). Although shown as being repeatedly performed once in FIG. 17, the printing at 330 can be repeatedly performed for any number of times, without limitation.

Figure 18:
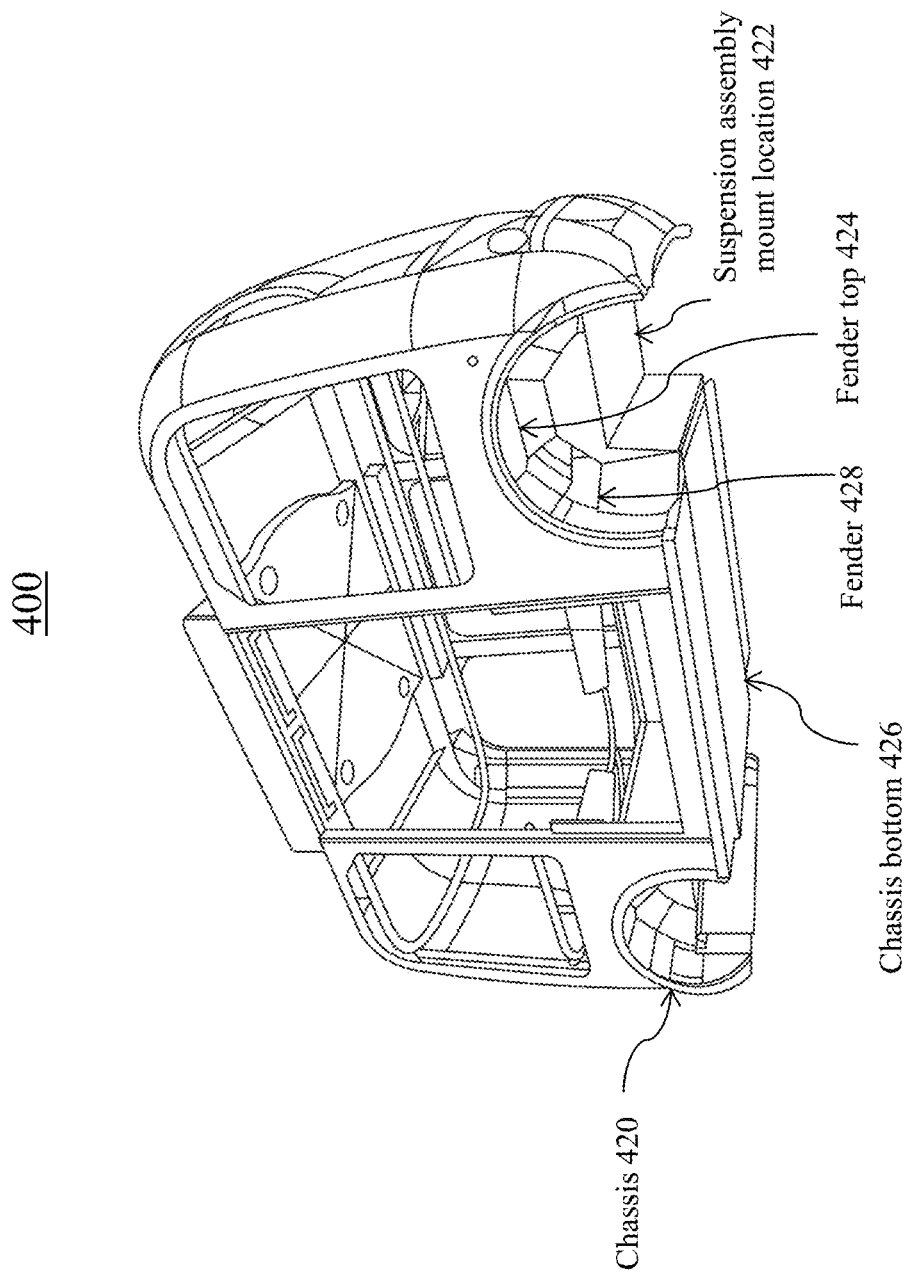
FIG. 18 is an exemplary perspective diagram illustrating an embodiment of a vehicle body manufactured using the method of FIG. 17.

Turning to FIG. 18, an exemplary automobile body 400 is shown as including a chassis 420 at a bottom of the body 400. The chassis 420 can be made via additive manufacturing by using the disclosed method 300 (shown in FIG. 17).

Figure 19:
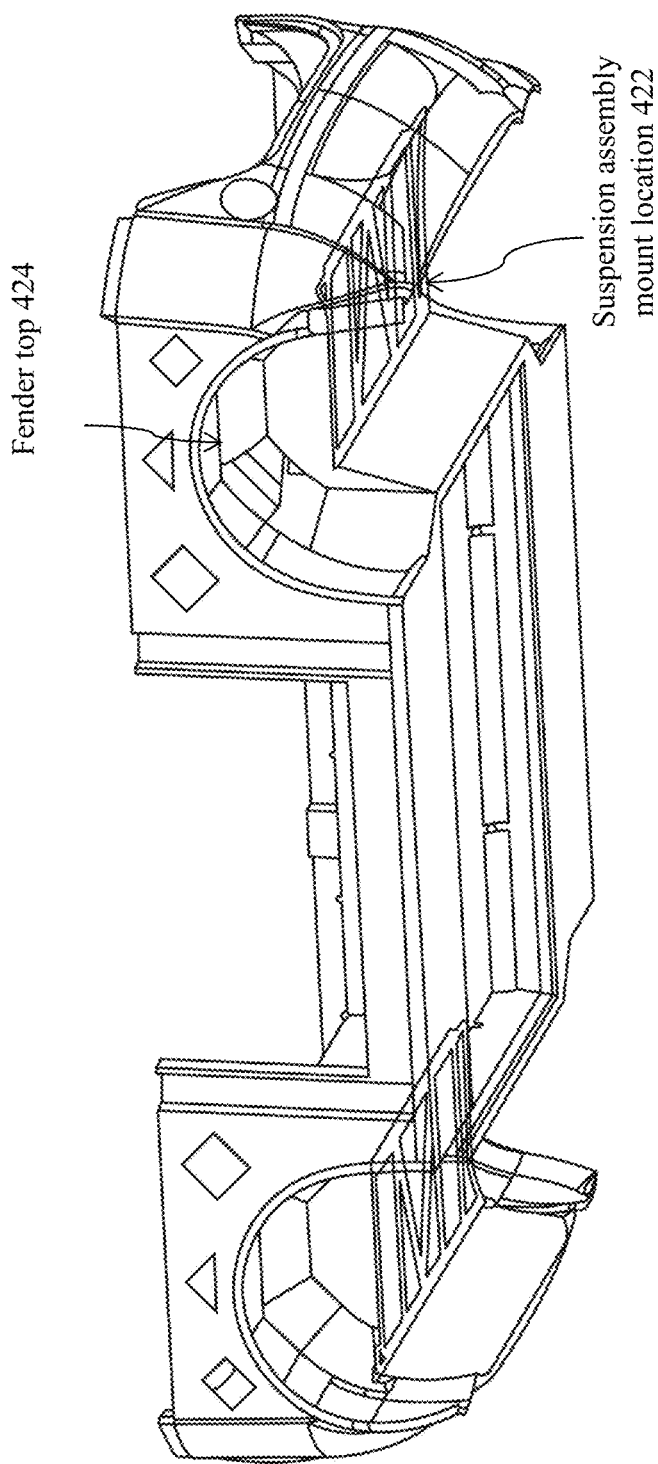
FIG. 19 is an exemplary detail drawing illustrating an embodiment of a chassis of the vehicle body of FIG. 18.

The chassis 420 is shown as including a chassis bottom 426. The chassis 420 further includes a suspension assembly mount location 422 and a fender 428 each raising above the chassis bottom 426. Stated somewhat differently, the suspension assembly mount location 422 and the fender 428 can both be farther from ground than the chassis bottom 426. The fender 428 is shown as including a fender top 424 that raises farther from ground than the suspension assembly mount location 422. FIG. 19 shows a close-up view of the chassis 420.

Figure 20:
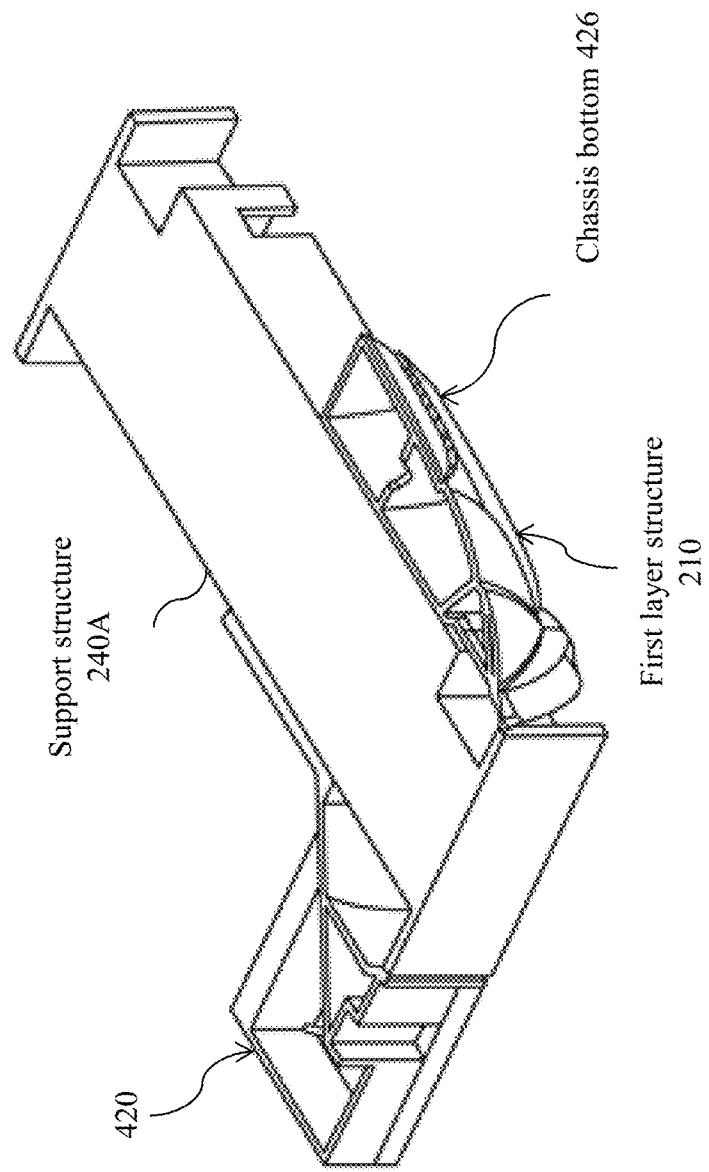
FIG. 20 is an exemplary detail drawing illustrating an alternative embodiment of the chassis of FIG. 19 during manufacturing, wherein a first layer structure is printed.

Turning to FIG. 20, at least a portion of the chassis 420 is shown as being made during a printing process. The first layer structure 210 is printed and is shown as including the chassis bottom 426. The support structure 240A is shown as being inserted in the first layer structure 210. Stated somewhat differently, the chassis bottom 426 is shown as including two first layer structures 210; the support structure 240A can be inserted between the two first layer structures 210. A surface of the support structure 240A can be coplanar with a surface of the chassis bottom 426.

The support structure 240A can be inserted in the first layer structure 210 during the printing process and can take a short time without significantly affecting speed of production. For example, the printing can be paused for a time interval ranging from 30 seconds to 60 seconds, and the support structure 240A can be inserted during the time interval.

Figure 21:
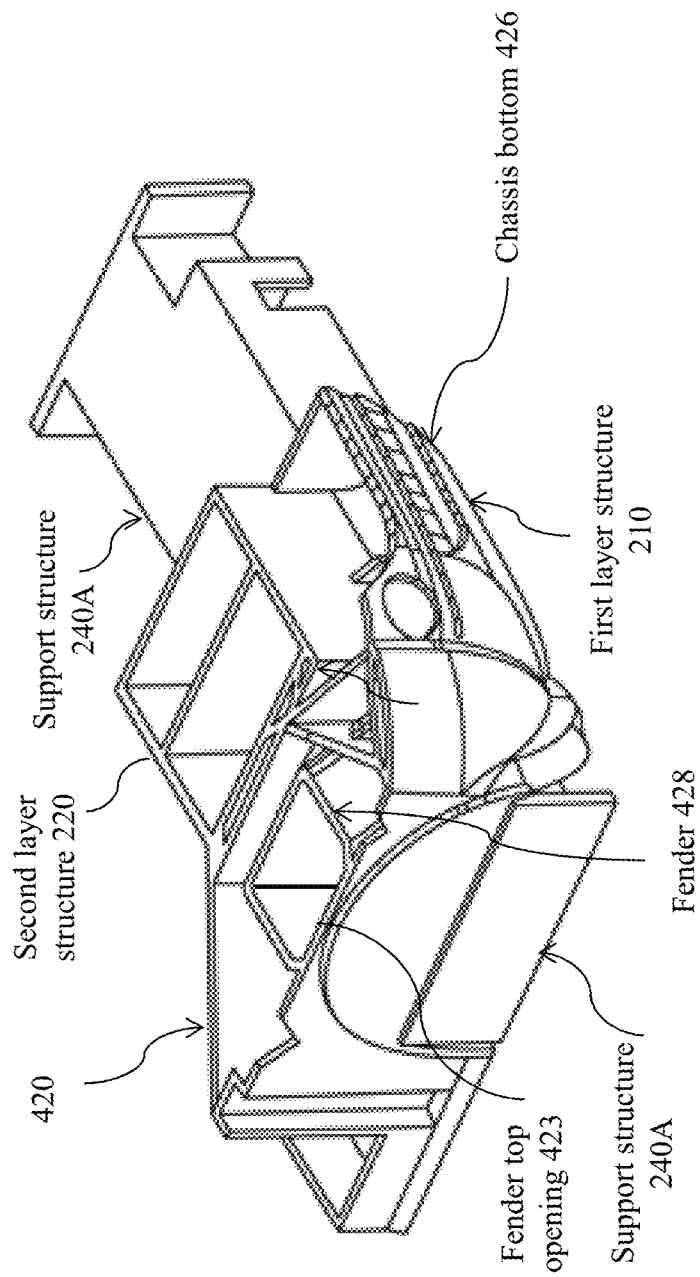
FIG. 21 is an exemplary detail drawing illustrating an alternative embodiment of the chassis of FIG. 20 during manufacturing, wherein a second layer structure is printed.

Turning to FIG. 21, the second layer structure 220 is shown as being formed on the first layer structure 210 and the support structure 240A. A portion of the second layer structure 220 can include the suspension assembly mount location 422 (shown in FIG. 19 and out of view in FIG. 21).

FIG. 21 shows the second layer structure 220 as defining a fender top opening 423. Directly printing the fender top 424 (shown in FIG. 19) can require significant bridging capability that the printing material may not possess. In one embodiment, height of the second layer structure 220 can at least partially be determined by the size of the portion of the fender 428 that can be printed with the bridging capability of the printing material. When the printing material has great bridging capability, the second layer structure 220 can include a significant portion of the fender 428, and the fender top opening 423 can be small.

Figure 22:
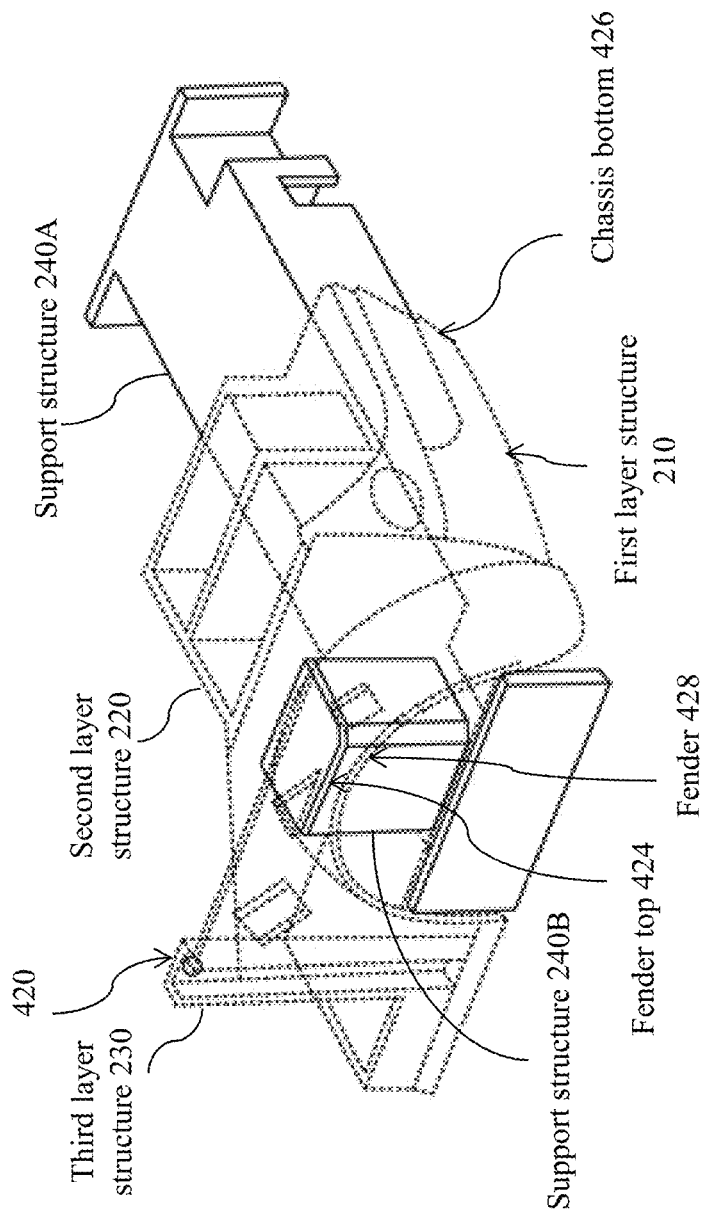
FIG. 22 is an exemplary detail drawing illustrating an alternative embodiment of the chassis of FIG. 21 during manufacturing, wherein a third layer structure is printed.

Turning to FIG. 22, the third layer structure 230 is shown as being formed on the second layer structure 220 and the support structure 240B. The first, second and third layer structures 210-230 are shown in wire-frame for easy viewing. FIG. 20 shows the support structure 240B as including a rectangular box or rectangular hexahedron and being stacked on the support structure 240A. The third layer structure 230 includes the fender top 424 that is printed on the support structure 240B.

The support structure 240B can be positioned in the fender top opening 423 (shown in FIG. 21) during the printing process and can take a short time without significantly affecting speed of production. For example, the printing can be paused for a time interval ranging from 30 seconds to 60 seconds, and the support structure 240B can be inserted during the time interval.

Figure 23:
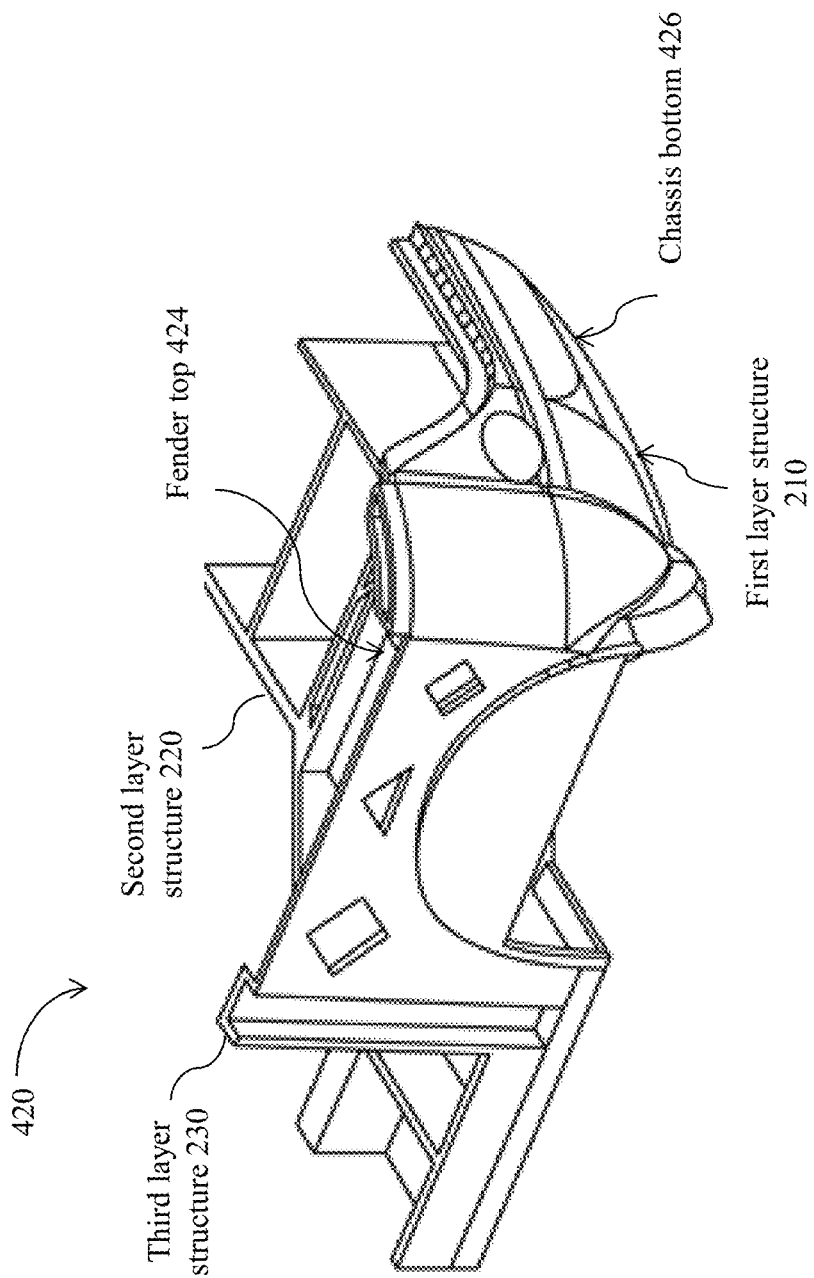
FIG. 23 is an exemplary detail drawing illustrating an alternative embodiment of the chassis of FIG. 22 during manufacturing, wherein support structures are removed from the chassis.

Turning to FIG. 23, the support structures 240A, 240B (shown in FIG. 22) are shown as having been removed from the second and third layer structures 220, 230. The chassis 420 can thus be formed.

The disclosed embodiments further disclose a structure 200 (shown in FIG. 5) that is made via additive manufacturing. The structure 200 can include the first layer structure 210 (shown in FIG. 5) having the sidewall 214 (shown in FIG. 5). The structure 200 can include the second layer structure 220 (shown in FIG. 5) stacked on the first layer structure 210 in the z-direction. Stated somewhat differently, the first and second structures 210, 220 can share the same stacking direction. The second layer structure 220 can include the overhang structure 224 (shown in FIG. 5) extending beyond the sidewall 214 and unsupported in the stacking direction. The disclosed embodiments further discloses the structure 200 as shown in FIGS. 7-11, 16 and 18-23.

Figure 24:
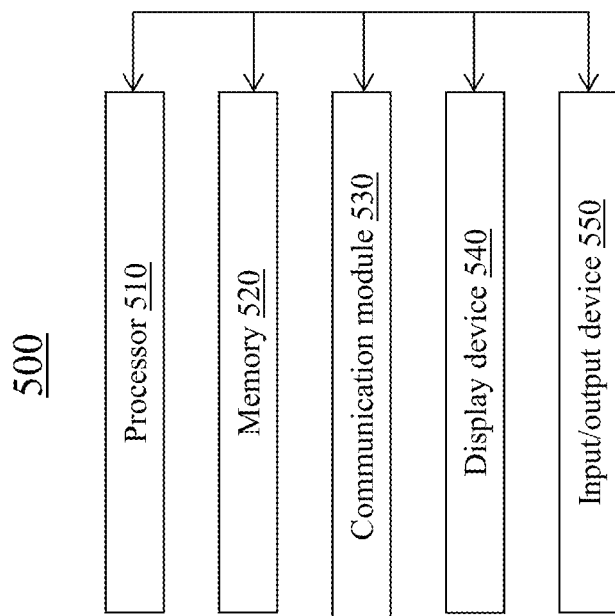
FIG. 24 is an exemplary diagram illustrating an embodiment of a control system for controlling the system of FIG. 1.

Turning to FIG. 24, a control system 500 for additive manufacturing is shown. The control system 500 can be configured for controlling the print head 120 (shown in FIG. 1). The control system 500 can include a processor 510. The processor 510 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like.

The processor 510 can execute instructions for implementing the control system 500 and/or computerized model of the structure 200 (shown in FIG. 5). In an un-limiting example, the instructions includes one or more additive manufacturing software programs. The programs can operate to control the system 100 with multiple printing options, settings and techniques for implementing additive printing of large components.

The programs can include a computer-aided design (CAD) program to generate a 3D computer model of the structure 200. Additionally and/or alternatively, the 3D computer model can be imported from another computer system (not shown). The 3D computer model can be solid, surface or mesh file format in an industry standard.

The programs can load the 3D computer model, create a print model and generate the machine code for controlling the system 100 to print the structure 200. Exemplary programs can include LSAM Print$^{3D}$, available from Thermwood Corporation located in Dale, Ind. Additionally and/or alternatively, exemplary programs can include Unfolder Module Software, Bend Simulation Software, Laser Programming and/or Nesting Software available from Cincinnati Incorporated located in Harrison, Ohio.

As shown in FIG. 24, the control system 500 can include one or more additional hardware components as desired. Exemplary additional hardware components include, but are not limited to, a memory 520 (alternatively referred to herein as a non-transitory computer readable medium). Exemplary memory 520 can include, for example, random access memory (RAM), static RAM, dynamic RAM, read-only memory (ROM), programmable ROM, erasable programmable ROM, electrically erasable programmable ROM, flash memory, secure digital (SD) card, and/or the like. Instructions for implementing the control system 500 and/or computerized model of the structure 200 can be stored on the memory 520 to be executed by the processor 510.

Additionally and/or alternatively, the control system 500 can include a communication module 530. The communication module 530 can include any conventional hardware and software that operates to exchange data and/or instruction between the control system 500 and another computer system (not shown) using any wired and/or wireless communication methods. For example, the control system 500 can receive computer-design data corresponding to the structure 200 via the communication module 530. Exemplary communication methods include, for example, radio, Wireless Fidelity (Wi-Fi), cellular, satellite, broadcasting, or a combination thereof.

Additionally and/or alternatively, the control system 500 can include a display device 540. The display device 540 can include any device that operates to present programming instructions for operating the control system 500 and/or present data related to the print head 120. Additionally and/or alternatively, the control system 500 can include one or more input/output devices 550 (for example, buttons, a keyboard, keypad, trackball), as desired.

The processor 510, the memory 520, the communication module 530, the display device 540, and/or the input/output device 550 can be configured to communicate, for example, using hardware connectors and buses and/or in a wireless manner.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for additive manufacturing via extrusion deposition, comprising:
    forming at least one first layer structure each including one or more first layers printed in a printing direction, the one or more first layers being stacked in a stacking direction perpendicular to the printing direction, the first layer structure includes a part of a chassis of an automobile body;
    forming a second layer structure on the at least one first layer structure and a first support structure, the second layer structure including one or more second layers printed in the printing direction, the one or more second layers being stacked in the stacking direction, the second layer structure defining an opening when viewed in the stacking direction;
    inserting a second support structure through the opening, the second support structure being located at least partially on the first support structure and being aligned with the opening;
    forming a third layer structure on the second layer structure and the second support structure, the third layer structure covering the opening; and
    removing the first and second support structures from the second and third layer structures, respectively.

2. The method of claim 1, wherein said forming the second layer structure includes forming an overhang structure at least partially supported by the first support structure during said forming the second layer structure.

3. The method of claim 1, wherein said forming the at least one first layer structure including forming two first layer structures, the first support structure being located between the two first layer structures.

4. The method of claim 3, wherein said forming the second layer structure includes forming the second layer structure bridging the two first layer structures and at least partially supported by the first support structure during said forming the second layer structure.

5. The method of claim 1, wherein the first support structure is not in contact with the at least one first layer structure during said forming the second layer structure.

6. The method of claim 1, wherein the at least one first layer structure or the second support structure is greater than 5 feet in at least one dimension.

7. The method of claim 1, wherein said forming the one or more first layer structure includes forming a first layer structure having a side wall at a side angle relative to the printing direction, the side angle ranging from 35 degrees to 90 degrees.

8. The method of claim 7, wherein said forming the one or more first layer structure includes forming the first layer structure having the side wall with the side angle varying along the side wall.

9. The method of claim 1, further comprising positioning the first support structure at a selected distance from the at least one first layer structure after said forming the at least one first layer structure and before said forming the second layer structure.

10. The method of claim 9, wherein the at least one first layer structure and the first support structure respectively have interfacing sides proximal to the second layer structure, and said positioning includes positioning the first support structure such that the interfacing sides being coplanar.

11. The method of claim 1, wherein the first support structure includes a base having a top surface that is to receive the second layer structure, the method further comprising depositing, before said forming the second layer structure, a release layer on the top surface of the base.

12. The method of claim 1, wherein said depositing includes depositing soapstone on the top surface of the base.

13. The method of claim 1, wherein the first support structure includes a base having a top surface that is to receive the second layer structure, the method further comprising:
    forming the base via additive manufacturing; and
    cooling, before said forming the second layer structure, the top surface of the base.

14. The method of claim 13, wherein said cooling includes spraying compressed gas onto the top surface of the base before said forming the second layer structure.

15. The method of claim 1, wherein the second layer structure is made of a first material and the first support structure is made of a second material different from the first material.

16. The method of claim 1, further comprising forming the first support structure at least partially made of foam.

17. The method of claim 1, wherein:
- said forming the at least one first layer structure includes forming a chassis bottom of the automobile body;
- said forming the second layer structure includes forming a fender and a suspension assembly mount location each connected to the chassis bottom, the fender defining a fender top opening; and
- said forming the third layer structure includes forming a fender top on the second support structure and covering the fender top opening.

* * * * *